United States Patent [19]

Tsukamoto et al.

[11] Patent Number: 5,630,772

[45] Date of Patent: May 20, 1997

[54] CONTROL METHOD AND CONTROL SYSTEM FOR AUTOMATIC TRANSMISSION

[75] Inventors: Kazumasa Tsukamoto, Toyota; Masahiro Hayabuchi; Masaaki Nishida, both of Anjo; Yoshihisa Yamamoto, Nishio; Muneo Kusafuka, Anjo; Hiroshi Tsutsui, Nishio; Akihito Iwata, Hekinan, all of Japan

[73] Assignee: Aisin AW Co., Ltd., Japan

[21] Appl. No.: 428,552

[22] Filed: Apr. 25, 1995

[30] Foreign Application Priority Data

May 2, 1994 [JP] Japan .................... 6-093592

[51] Int. Cl.⁶ .................... B60K 41/20
[52] U.S. Cl. .................... 477/95; 477/93; 477/79; 477/194; 475/120
[58] Field of Search .................... 477/93, 95, 96, 477/901, 70, 71, 79, 80, 194; 475/119, 120

[56] References Cited

U.S. PATENT DOCUMENTS

| | | | |
|---|---|---|---|
| 4,513,639 | 4/1985 | Hiramatsu | 74/866 |
| 4,644,826 | 2/1987 | Kubo et al. | 477/93 X |
| 4,648,289 | 3/1987 | Kubo et al. | 477/93 |
| 4,650,046 | 3/1987 | Parsons | 192/3 |
| 4,879,925 | 11/1989 | Taga et al. | 74/867 |
| 4,991,464 | 2/1991 | Ishikawa et al. | 477/95 |
| 5,211,082 | 5/1993 | Sasaki et al. | 475/119 X |
| 5,213,013 | 5/1993 | Funiwara et al. | 475/120 |
| 5,334,114 | 8/1994 | Ando et al. | 475/119 |
| 5,368,531 | 11/1994 | Ando et al. | 477/155 |

Primary Examiner—Charles A. Marmor
Assistant Examiner—Peter T. Kwon
Attorney, Agent, or Firm—Lorusso & Loud

[57] ABSTRACT

A system and method for controlling an automatic transmission in a vehicle drive train including an engine, the automatic transmission and a fluid coupling for transmitting the rotation of the engine to the transmission. The transmission includes a clutch applied when a forward running range is selected; a second one-way clutch which is applied, when the first clutch is applied, to establish a forward 1st speed; and a brake for locking the one-way clutch, when applied, to block the reverse rotation of the output shaft of the transmission. A first hydraulic servo receives a first oil pressure for applying the first clutch and a second hydraulic servo receives a second oil pressure for applying the brake. When a forward running range is selected, with the vehicle stopped, the engine idling and a foot brake engaged, the oil pressure of the first hydraulic servo is lowered from the oil pressure at the 1st speed whereas the oil pressure of the second hydraulic servo is raised to a modulated pressure. The modulated pressure is set to generate, against the reverse force on the vehicle facing up an incline, a resistance corresponding to the forward driving force generated when the engine is idling in 1st speed.

10 Claims, 16 Drawing Sheets

|   |   | Solenoid | | | Clutch | | | Brake | | | | One-way Clutch | | |
|---|---|---|---|---|---|---|---|---|---|---|---|---|---|---|
|   |   | S1 | S2 | S3 | C1 | C2 | C3 | B1 | B2 | B3 | B4 | F1 | F2 | F3 |
| R |   | × | ○ | × | × | ○ | × | × | × | ○ | ○ | × | × | × |
| N |   | × | ○ | × | × | × | × | × | × | × | ○ | × | × | × |
| D | 1 ST | × | ○ | △ | ○ | × | × | × | × | (○) | ○ | × | ○ | ○ |
|   | 2 ND | ○ | ○ | △ | ○ | × | × | ○ | ○ | × | ○ | ○ | × | ○ |
|   | 3 RD | ○ | × | × | ○ | × | ○ | ○ | ○ | × | × | ○ | × | × |
|   | 4 TH | × | × | × | ○ | ○ | ○ | × | ○ | × | × | × | × | × |

FIG. 3

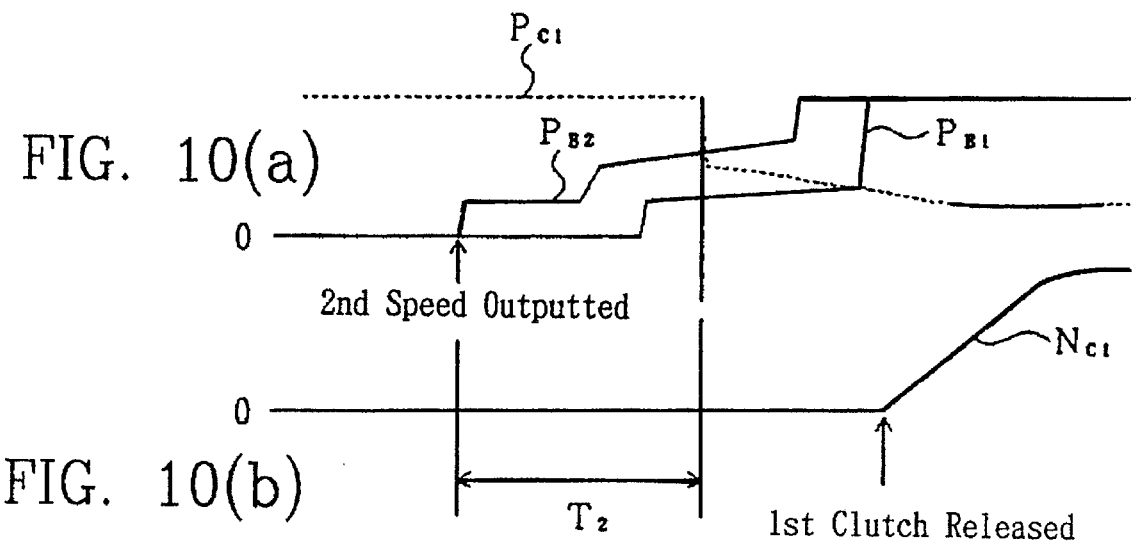
FIG. 10(a)
FIG. 10(b)
FIG. 11
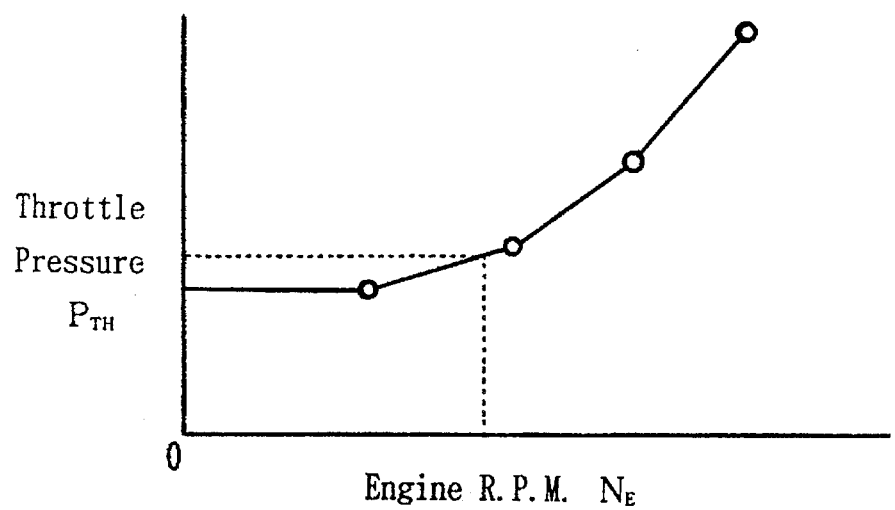

FIG. 12
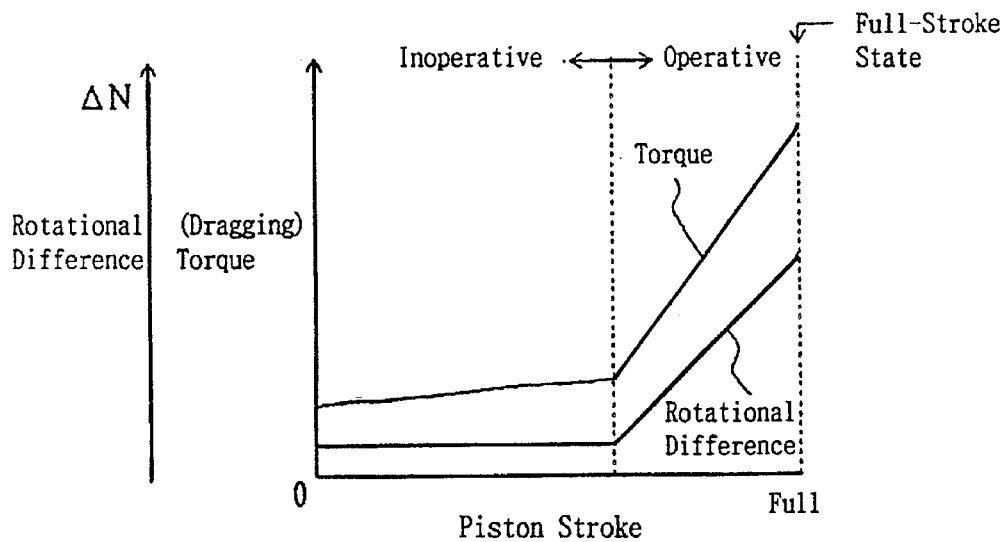
FIG. 13(a)
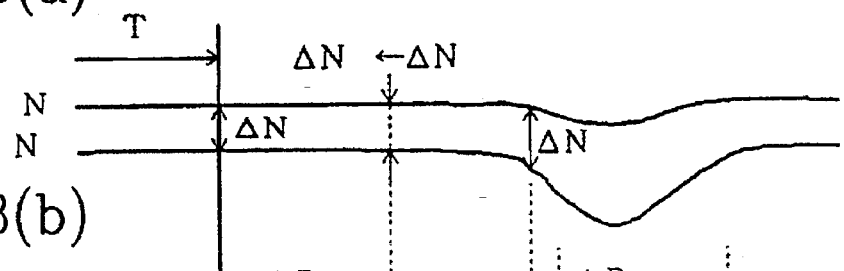
FIG. 13(b)
FIG. 13(c)
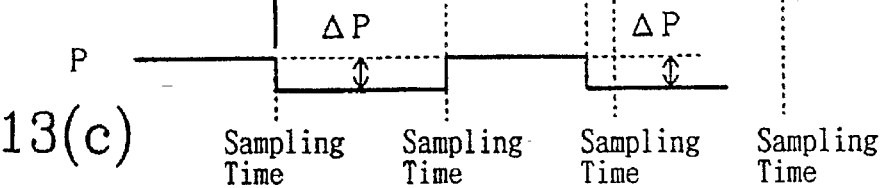
FIG. 14
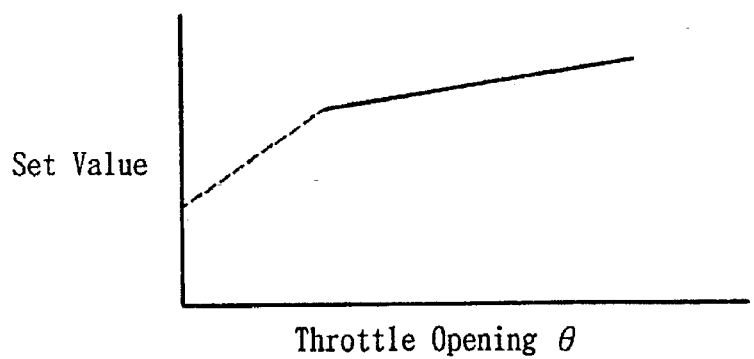

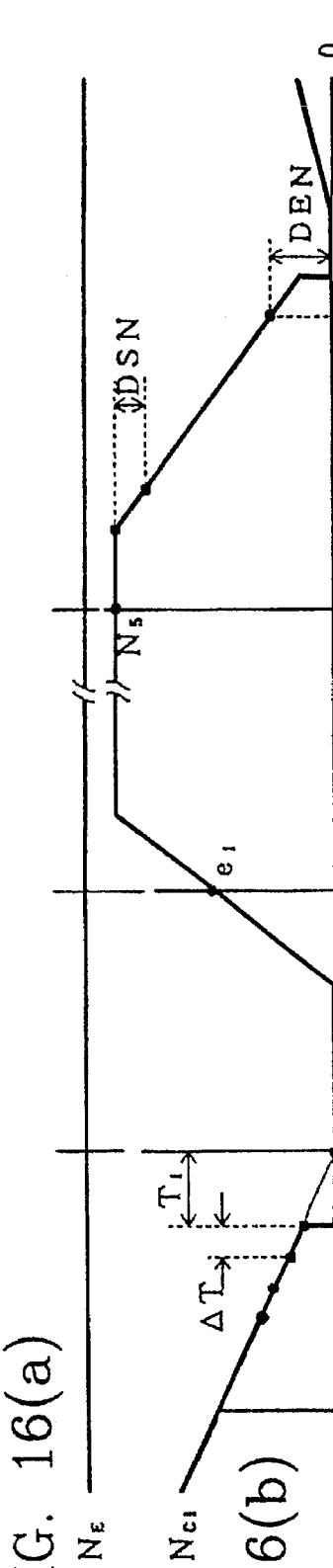
FIG. 16(a)
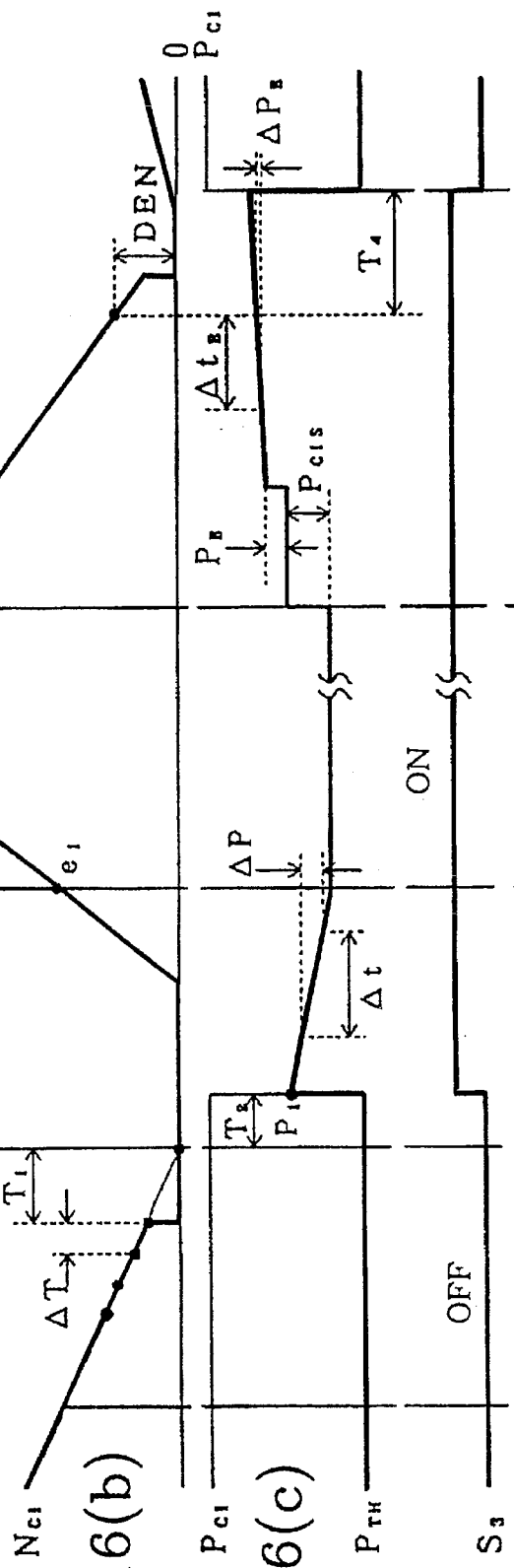
FIG. 16(b)
FIG. 16(c)
FIG. 16(d)
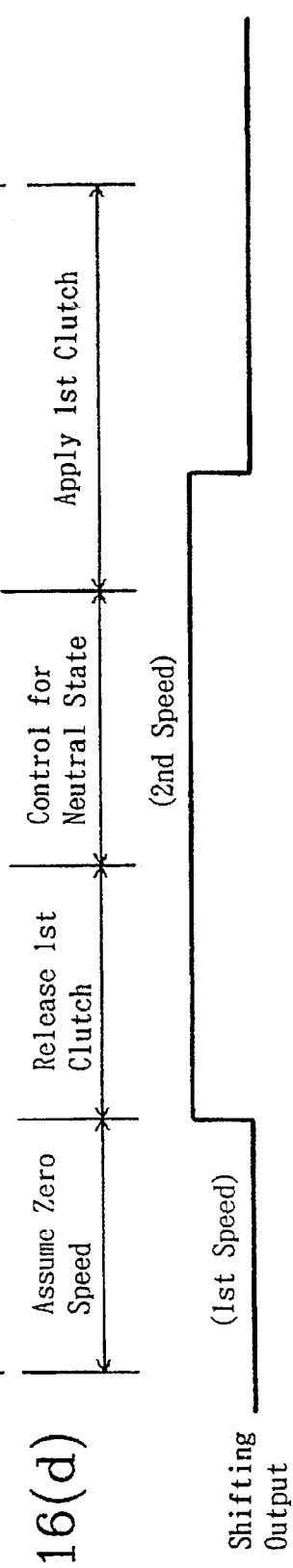
FIG. 16(e)

CONTROL METHOD AND CONTROL SYSTEM FOR AUTOMATIC TRANSMISSION

BACKGROUND OF THE INVENTION

1. Field of the Invention

The present invention relates to a control method and a control system for an automatic transmission.

2. Related Art

The conventional automatic transmissions of the prior art include a torque converter acting as a fluid coupling for receiving the rotation generated by an engine, and a gear change unit for changing the speed of the rotation transmitted from the torque converter. The gear change unit has at least one planetary gear set composed of a plurality of gear elements and effects a shift in accordance with a shift pattern which is preset to be followed in accordance with vehicle speed, the throttle opening and so on.

In using the prior art automatic transmission the driver can select a (parking) P-range, a (reverse) R-range, a (neutral) N-range, a (drive) D-range, a (second) S-range, a (low) L-range and so on. If the range is switched from the N-range to the D-range by the shift lever, for example, the rotation of the engine at idle is transmitted through the torque converter to the transmission, to produce a creep phenomenon in which the vehicle will advance little by little without any depression of the accelerator pedal.

When, therefore, a range such as the D-range, the S-range or the L-range (hereinafter each referred to as a "forward range") for moving the vehicle forward is selected, while the vehicle is substantially at a standstill, the forward clutch to be applied in forward running, i.e., a first clutch, is released or brought into slipping engagement to establish a pseudo-neutral state (hereinafter called the "neutral control state") so that the aforementioned creep phenomenon may be prevented.

When the above-mentioned neutral control state is to be established, hill-holding control is simultaneously applied to prevent reverse movement of the vehicle, against the will of the driver, on an incline (as disclosed in U.S. Pat. No. 4,648,289). In the hill-holding mode, one of a plurality of frictional engagement elements of the transmission is engaged to prevent the output shaft of the transmission from rotating in reverse. However, if the accelerator pedal is depressed to start the vehicle while in the hill-holding mode, the application of the first clutch and the release of the hill-holding control are simultaneously effected. Since, however, there is an abrupt shift from the state in which the reverse motion of the vehicle is blocked by the hill-holding control, to a state in which the hill-holding control is inactive, the vehicle may move backward, against the will of the driver, when an attempt is made to start the vehicle uphill on a steep gradient.

Specifically, when the neutral control and the hill-holding control are not in effect facing uphill on a steep incline, the driver must exert a high depressing force on the brake pedal to stop the vehicle. However, when the vehicle is to be started, the driver must gradually reduce the depressing force on the brake pedal. The driver then becomes aware of the necessity of quickly applying a high force of depression to the accelerator pedal, before the brake pedal is fully released, because the vehicle would otherwise gradually roll backward. As a result, if depression of the accelerator pedal is not too late or too little, it is possible to start without significant backward movement of the vehicle.

On the other hand, in the aforementioned control system of the prior art, the blocking force which holds against backward movement of the vehicle is provided by the hill-holding control until the brake pedal is fully released. However, when the brake pedal is fully released, the blocking force is suddenly removed by cancellation of the hill-holding control. As a result, if the driver is slow to become aware of necessity of above-mentioned operation of the accelerator pedal, the vehicle will roll backward, contrary to the driver's intention.

SUMMARY OF THE INVENTION

An object of the present invention is to solve the aforementioned problems of the control system for an automatic transmission of the prior art and to provide a control method and a control system for an automatic transmission which prevents the vehicle from running backward against the will of the driver, when an attempt is made to start the vehicle uphill on a steep incline.

According to the present invention, therefore, there is provided a control method for an automatic transmission which includes: a fluid coupling for transmitting the rotation of the engine to a transmission (gear change unit); a first clutch adapted to be applied when a forward running range is selected; a second, one-way clutch adapted to engage when the first clutch is applied, to establish a forward 1st speed; a brake for locking the one-way clutch, when engaged, to block backward rotation of the output shaft of the transmission; a first hydraulic servo for receiving an oil pressure to apply the first clutch; and a second hydraulic servo for receiving an oil pressure to apply the brake, wherein the method includes:

responsive to selection of a forward running range with the vehicle stopped, with the engine idling and with the foot brake applied, lowering the oil pressure to the first hydraulic servo from the oil pressure at the 1st speed and raising the oil pressure to the second hydraulic servo to a modulated pressure sufficient to generate, against the reverse gravitational force on the vehicle, a resistance corresponding to the forward driving force of the engine idling in 1st speed.

According to the present invention, there is also provided a control system for an automatic transmission, which comprises: a fluid coupling for transmitting the rotation of the engine to a transmission; a first clutch adapted to be applied when a forward running range is selected; a second, one-way clutch adapted to be engaged when the clutch is applied, to establish a forward 1st speed; a brake for locking the one-way clutch, when engaged, to block backward rotation of the output shaft of the transmission; a first hydraulic servo for receiving an oil pressure to apply the first clutch; a second hydraulic servo for receiving an oil pressure to apply the brake; and a hydraulic control unit for selectively feeding oil pressures to the first and second hydraulic servos.

The hydraulic control unit includes: pressure-reducing means for lowering the oil pressure to the first hydraulic servo to below the oil pressure at the 1st speed, when the forward running range is selected, with the vehicle stopped, the engine at idle and the foot brake engaged; and oil pressure feeding means for feeding the oil pressure to the second hydraulic servo.

The oil pressure fed to the second hydraulic servo is set to provide, against the reverse force on the vehicle, a resistance corresponding to the forward driving force produced with the engine idling in 1st speed.

In the control system of the present invention, the oil pressure feeding means may be a modulator valve located in an oil passage for feeding oil pressure to the second hydraulic servo, the modulator valve having a spool and a spring urging the spool in one direction. The spool has a first pressure receiving face which receives the oil pressure, fed to the second hydraulic servo, operating against the urging force of the spring, and a second pressure receiving face which receives the oil pressure of the first hydraulic servo, also operating against the urging force of the spring.

The modulator valve feeds the oil pressure to the second hydraulic servo, responsive to a lowering of the oil pressure to the first hydraulic servo, and blocks feed of oil pressure to the second hydraulic servo when the oil pressure of the first hydraulic servo is not lowered.

Once the vehicle is started, the oil pressure of the first hydraulic servo rises so that the forward driving force is generated by the engagement of the clutch. As a result, the timings for applying the clutch and releasing the brake can be synchronized simply by using the oil pressure of the first hydraulic servo as the control oil pressure and by interrupting the feed of the oil pressure to the second hydraulic servo.

In another aspect of the control system of the present invention, the brake is applied at a gear stage higher than the 1st speed to effect engine braking.

The pressure-reducing means includes a regulator valve for regulating the oil pressure fed to the first hydraulic servo and a change-over valve. The regulator valve outputs a forward range running pressure responsive to selection of a forward running range. The change-over valve is switchable between (1) a pressure-reducing position, in which it feeds the oil pressure from the regulator valve to the first hydraulic servo when a forward running range is selected, while the vehicle is stopped with the engine idling and the foot brake engaged, and (2) a forward running range position, in which it feeds the forward running range pressure to the first hydraulic servo and to the second pressure receiving face of the modulator valve only when it is in the pressure-reducing position.

The modulator valve feeds an oil pressure for engine braking to the second hydraulic servo when the oil pressure of the first hydraulic servo is not received at the second pressure receiving face.

Thus, in the control system of the present invention, when a forward running range is selected, oil pressure is fed to the first hydraulic servo to apply the first clutch so that the rotation of the engine is transmitted through the fluid coupling to the transmission. Then, the one-way clutch is locked to establish the 1st speed. When the oil pressure is fed to the second hydraulic servo, on the other hand, the brake is applied to block the reverse rotation of the output shaft of the transmission.

In the system of the present invention, when the forward running range is selected, when the vehicle is stopped, when the engine is idling and when the foot brake is operated, the oil pressure of the first hydraulic servo is lowered from the oil pressure at the 1st speed whereas the oil pressure of the second hydraulic servo is raised to the modulated pressure. The modulated pressure is set to generate, against the reverse force on the vehicle, a resistance corresponding to the forward driving force at the time when the engine is idling in 1st speed.

Resistance equal to that when the clutch is applied can be generated in the brake if the vehicle is facing uphill on a gradient such that the reverse force on the vehicle can be offset with ordinary forward driving force (idling in first speed). Therefore, the driver is able to start the vehicle without any feeling of reverse motion merely by performing operations similar to those with the clutch being applied.

On the other hand, if the vehicle is to be started uphill on a steep gradient, if the driver reduces the force on the foot brake, the shifting brake is brought into slipping engagement to allow the vehicle to move backward. In order to prevent this backward motion, therefore, the driver must increase the braking force. As a result, the driver recognizes the need to increase the depression of the accelerator pedal for starting the vehicle. As a result, the vehicle is prevented from running backward against the will of the driver.

By the action of the modulator valve, the second hydraulic servo can be fed, not only the oil pressure for establishing the resistance force for hill-holding, but also the oil pressure necessary for engine braking. Generally speaking, when engine braking is effected by applying the shifting brake at a gear stage higher than 1st speed, it is sufficient to feed the second hydraulic servo with a relatively low oil pressure, as regulated by the modulator valve. As a result, the hydraulic control system can be reduced in size by utilization of the modulator valve.

BRIEF DESCRIPTION OF THE DRAWINGS

FIG. 3 is a chart of the operations of the automatic transmission according to the embodiment of the present invention;

FIG. 10 is a time chart for shifting to 2nd speed in the embodiment of the present invention;

FIG. 11 is a graph plotting throttle pressure against engine R.P.M. in the embodiment of the present invention;

FIG. 12 is a diagram illustrating the state of the 1st clutch in the neutral state in the embodiment of the present invention;

FIG. 13 is a time chart illustrating the engine R.P.M., the R.P.M. at the clutch input side and the C-1 oil pressure in neutral;

FIG. 14 is a graph plotting a set value against throttle opening in the embodiment of the present invention;

FIG. 16 is a time chart for operation of an automatic transmission control system according to an embodiment of the present invention;

DESCRIPTION OF THE PREFERRED EMBODIMENT

An embodiment of the present invention will be described in detail in the following with reference to the accompanying drawings.

Figure 1:
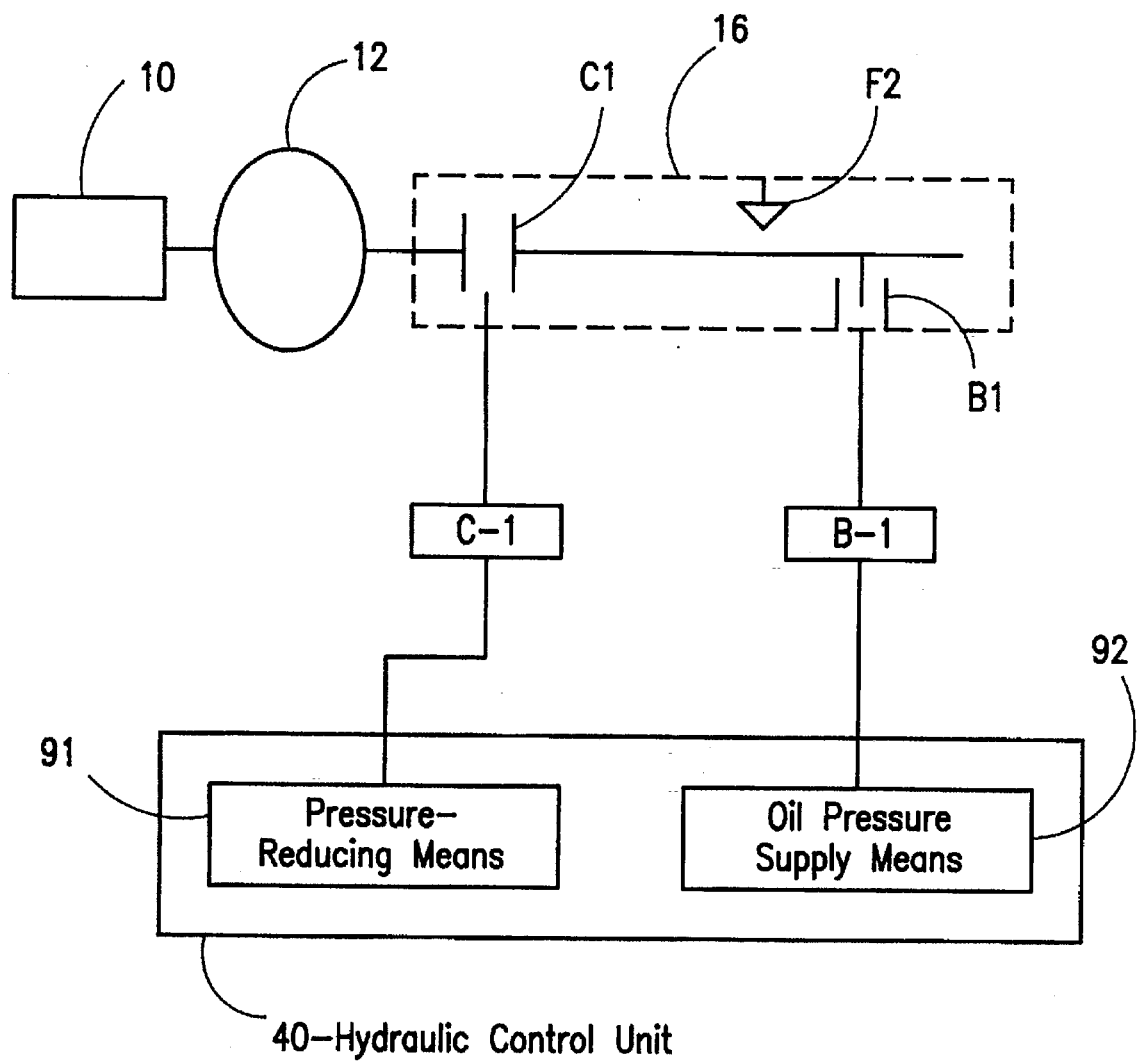
FIG. 1 is a block diagram showing an automatic transmission according to an embodiment of the present invention.

As shown in FIG. 1, the automatic transmission includes a torque converter 12 acting as a fluid coupling for transmitting the rotation of an engine 10 to a transmission 16. A first clutch C1 is applied when a forward running range is selected and a second, one-way clutch F2, is engaged when the first clutch C1 is applied, to achieve a forward 1st speed. A first brake B1 locks the one-way clutch F2 to prevent reverse rotation of the output shaft of the transmission 16. A first hydraulic servo C-1 receives an oil pressure and applies the first clutch C1 in accordance with the received oil pressure. A second hydraulic servo B-1 receives an oil pressure for applying the first brake B1. A hydraulic control unit 40 controls the feeding of oil pressures to the hydraulic servo C-1 and the hydraulic servo B-1.

The hydraulic control unit 40 includes a pressure-reducing means 91 for lowering the oil pressure to the hydraulic servo C-1 to a value below that of the 1st speed, when the D-range is selected, when the vehicle is stopped, when the engine 10 is idling and when the foot brake is engaged, and oil pressure feeding means 92 for feeding oil pressure to the hydraulic servo B-1.

The oil pressure to be fed to the hydraulic servo B-1 is set to establish, against the reverse force on the vehicle, a resistance corresponding to the forward driving force with the engine 10 idling and 1st speed established.

Figure 2:
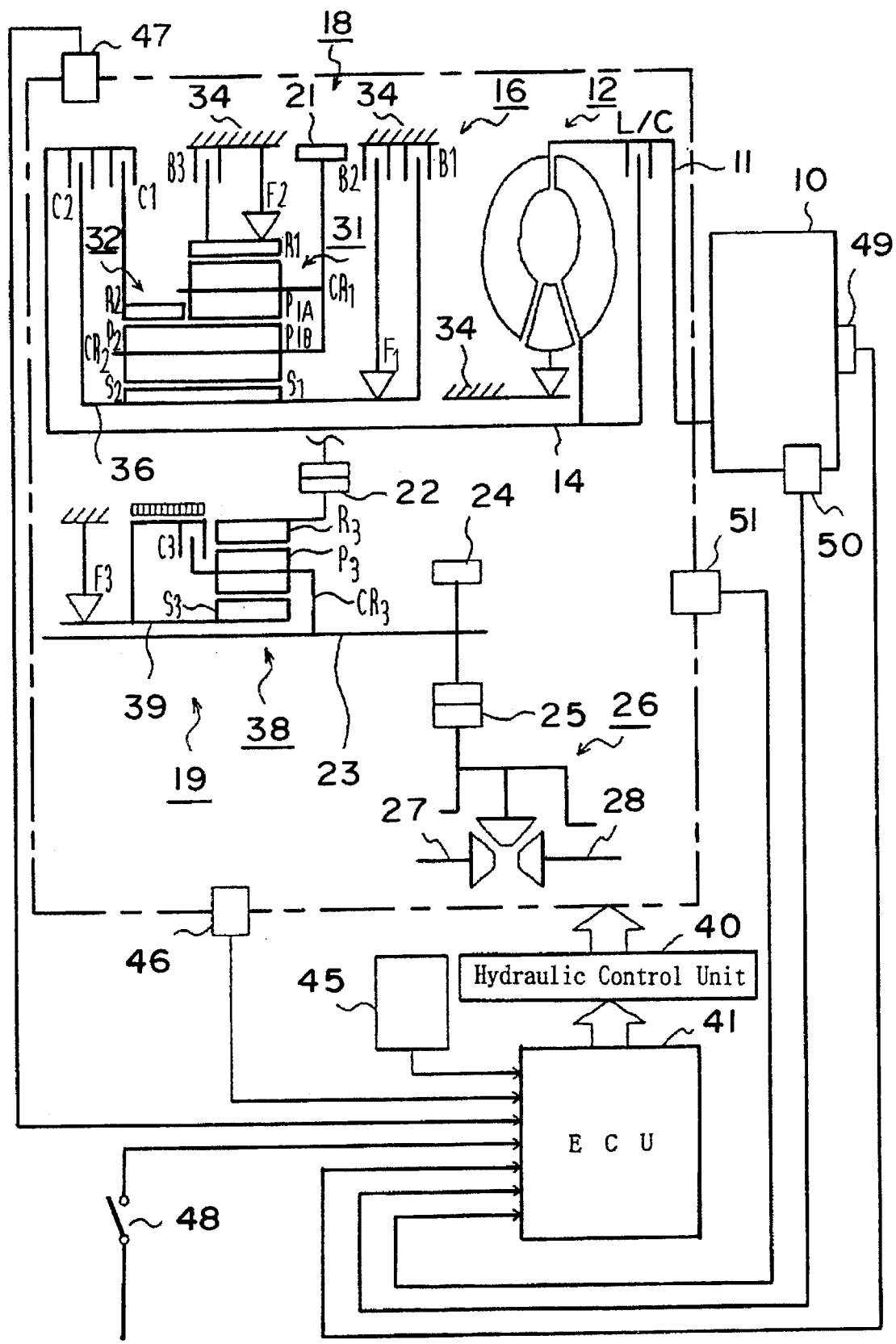
FIG. 2 is a schematic diagram showing the automatic transmission according to the embodiment of the present invention.

As shown in FIG. 2, the rotation generated by the engine 10 is transmitted through an output shaft 11 to a torque converter 12 acting as a fluid coupling. This torque converter 12 transmits the rotation of the engine 10 through a working fluid to an output shaft 14 but also has the capability to transmit the rotation of the engine 10 directly to the output shaft 14 through a lock-up clutch L/C which is applied when the vehicle speed v exceeds a set (predetermined) value.

Transmission 16 is connected to the output shaft 14 for effecting four forward speeds and reverse. This transmission 16 is composed of a main transmission section 18, for effecting three forward speeds and one reverse, and an auxiliary transmission section 19 of under-drive type. Thus, the rotation of the main transmission section 18 is transmitted through a counter drive gear 21 and a counter driven gear 22 to the auxiliary transmission 19, the output shaft 23 of which transmits its rotation through an output gear 24 and a ring gear 25 to a differential unit 26.

In this differential unit 26, the rotation transmitted through the output gear 24 is differentiated so that the differentiated rotations are transmitted to the drive wheels (not shown) through left-hand and right-hand drive shafts 27 and 28.

The main transmission 18 includes a first planetary gear unit 31, a second planetary gear unit 32, first and second clutches C1 and C2, first, second and third brakes B1, B2 and B3, and first and second one-way clutches F1 and F2, the clutches and brakes selectively transmitting the torque between the individual elements of the two planetary gear units 31 and 32. Incidentally, the first clutch C1 corresponds to the clutch C of FIG. 1.

The first planetary gear unit 31 is composed of: a ring gear R1 connected to a drive unit casing 34 through the third brake B3 and the second one-way clutch F2 which are juxtaposed to each other; a sun gear $S_1$ formed on a sun gear shaft 36 which is fitted on and rotatably supported by the output shaft 14; a carrier $CR_1$ connected to the counter drive gear 21; and pinions $P_{1A}$ and $P_{1B}$ meshing between the ring gear $R_1$ and the sun gear $S_1$ and rotatably supported by the carrier $CR_1$.

The aforementioned sun gear shaft 36 is connected through the second clutch C2 to the output shaft 14. Moreover, the sun gear shaft 36 is connected to the drive unit casing 34 through the first brake B1 and through the first one-way clutch F1 and the second brake B2 which are juxtaposed to each other.

On the other hand, the aforementioned second planetary gear unit 32 is composed of: a ring gear $R_2$ connected through a first clutch C1 to the output shaft 14; a sun gear $S_2$ formed on the sun gear shaft 36 integrally with the sun gear $S_1$; a carrier $CR_2$ connected to the carrier $CR_1$; and a pinion $P_2$ meshing between the ring gear $R_2$ and the sun gear $S_2$, rotatably supported by the carrier $CR_2$ and formed integrally with the pinion $P_{1B}$.

The aforementioned counter drive gear 21 meshes with the counter driven gear 22, which is arranged in the auxiliary transmission 19, to transmit rotation, at a speed determined by the main transmission 18, to the auxiliary transmission 19.

This auxiliary transmission 19 includes a third planetary gear unit 38. A third clutch C3, a fourth brake B4 and a third one-way clutch F3 selectively transmit torque between the individual elements of the planetary gear unit 38.

This third planetary gear unit 38 is composed of: a ring gear $R_3$ connected to the counter driven gear 22; a sun gear $S_3$ formed on a sun gear shaft 39 which is rotatably supported on the output shaft 23; a carrier $CR_3$ fixed on the output shaft 23; and a pinion $P_3$ meshing between the ring gear $R_3$ and the sun gear $S_3$ and rotatably supported by the carrier $CR_3$.

Operation of the automatic transmission is shown in FIG. 3. In FIG. 3, S1 is the first solenoid valve, S2 is the second solenoid valve, S3 is the third solenoid valve, C1 is the first clutch, C2 is the second clutch, C3 is the third clutch, B1 is the first brake; B2 is the second brake, B3 is the third brake, B4 is the fourth brake, F1 is the first one-way clutch, F2 is the second one-way clutch, and F3 is the third one-way clutch. Moreover, R is an R-range, N is an N-range, D is a D-range, 1ST is a 1st speed gear stage, 2ND is a 2nd speed gear stage, 3RD is a 3rd speed gear stage, and 4TH is a 4th speed gear stage.

Also in FIG. 3, symbol O indicates that the first solenoid valve S1, the second solenoid valve S2 and the third solenoid valve S3 are ON, that the first clutch C1, the second clutch C2, the third clutch C3, the first brake B1, the second brake B2, the third brake B3 and the fourth brake B4 are applied, and that the first one-way clutch F1, the second one-way clutch F2 and the third one-way clutch F3 are locked. On the other hand, symbol X indicates that the first solenoid valve S1, the second solenoid valve S2 and the third solenoid valve S3 are OFF, that the first clutch C1, the second clutch C2, the third clutch C3, the first brake B1, the second brake B2, the third brake B3 and the fourth brake B4 are released, and that the first one-way clutch F1, the second one-way clutch F2 and the third one-way clutch F3 are set free.

Symbol A indicates that those elements are turned ON/OFF when a neutral control state is established, and symbol (O) indicates that the elements are applied for engine braking.

As shown in FIG. 3, at 1st speed in the D-range, the first clutch C1 and the fourth brake B4 are applied, and the second one-way clutch F2 and the third one-way clutch F3 are locked. Then, the rotation of the input shaft 14 is transmitted through the first clutch C1 to the ring gear $R_2$. Since, in this state, the rotation of the ring gear $R_1$ is blocked by the second one-way clutch F2, the rotation of the carrier $CR_2$ is drastically decelerated, with idling rotation of the sun gear S2, and is transmitted to the counter drive gear 21.

The rotation transmitted from the counter drive gear 21 to the counter driven gear 22 is further transmitted to the ring gear $R_3$. Since, however, the rotation of the sun gear $S_3$ is blocked by the fourth brake B4, the rotation of the carrier $CR_3$ is further decelerated and is transmitted to the output shaft 23.

At the 2nd speed in the D-range, on the other hand, the first clutch C1, the first brake B1, the second brake B2 and the fourth brake B4 are applied, and the first one-way clutch F1 and the third one-way clutch F3 are locked. Then, the rotation of the input shaft 14 is transmitted through the first clutch C1 to the ring gear $R_2$, but the rotation of the sun gear S2 is blocked by the second brake B2 and the first one-way clutch F1. As a result, the rotation of the ring gear $R_2$ is decelerated and transmitted to the carrier $CR_2$, the rotation of which is transmitted to the counter drive gear 21, with idling rotation of the ring gear $R_1$.

The rotation transmitted from the counter drive gear 21 to the counter driven gear 22 is transmitted to the ring gear $R_3$. Since, however, the rotation of the sun gear $S_3$ is blocked by the fourth brake B4, the rotation of the carrier $CR_3$ is decelerated and transmitted to the output shaft 23.

Next, at the 3rd speed in the D-range, the first clutch C1, the third clutch C3, the first brake B1 and the second brake B2 are applied, and the first one-way clutch F1 is locked. Then, the rotation of the input shaft 14 is transmitted through the first clutch C1 to the ring gear $R_2$, and the rotation of the sun gear $S_2$ is blocked by the second brake B2 and the first one-way clutch F1. As a result, the rotation of the ring gear $R_2$ is decelerated and transmitted to the carrier $CR_2$, the rotation of which is transmitted to the counter drive gear 21, with idling rotation of the ring gear $R_1$.

The rotation transmitted from the counter drive gear 21 to the counter driven gear 22 is transmitted to the ring gear $R_3$. Since, however, relative rotation between the carrier $CR_3$ and the sun gear $S_3$ are blocked by the third clutch C3, the third planetary gear 38 comes into its directly connected state. As a result, the rotation of the counter driven gear 22 is transmitted as is to the output shaft 23.

Next, at the 4th speed in the D-range, the first clutch C1, the second clutch C2, the third clutch C3 and the second brake B2 are applied. Then, the rotation of the input shaft 14 is transmitted through the first clutch C1 to the ring gear $R_2$ and through the second clutch C2 to the sun gear $S_2$ so that the first and second planetary gear units 31 and 32 come into their directly connected states. As a result, the rotation of the output shaft 11 is transmitted as is to the counter drive gear 21.

The rotation transmitted from the counter driven gear 21 to the counter driven gear 22 is further transmitted to the ring gear $R_3$. Since, however, relative rotation between of the carrier $CR_3$ and the sun gear $S_3$ is blocked by the third clutch C3, the third planetary gear unit 38 comes into its directly connected state. As a result, the rotation of the counter driven gear 22 is transmitted as is to the output shaft 23.

The above-described automatic transmission also has a hydraulic circuit (not shown) for applying/releasing the first clutch C1, the second clutch C2, the third clutch C3, the first brake B1, the second brake B2, the third brake B3 and the fourth brake B4, and this hydraulic circuit can be controlled by the hydraulic control circuit 40. Hydraulic control circuit 40 is connected to an automatic transmission controller (i.e., ECU) 41 so that it is controlled according to the control program of the automatic transmission controller 41.

The automatic transmission controller 41 receives input signals from a neutral start switch (i.e., N.S.S.W.) 45, an oil temperature sensor, an R.P.M. sensor 47, a brake switch 48, an engine R.P.M. sensor 49, a throttle opening sensor 50 and a vehicle speed sensor 51. Incidentally, the R.P.M. sensor 47 and the engine R.P.M. sensor 49, respectively, correspond to sensors 471 and 491 of FIG. 1.

Thus, the shift position of the shift lever (not shown), i.e., the selected range, can be detected by the neutral start switch the temperature of the oil in the hydraulic circuit can be detected by the oil temperature sensor 46; and the R.P.M. of the input side of the first clutch C1, i.e., the R.P.M. $N_{C1}$ of the output shaft 14, (hereinafter, "clutch input side R.P.M.") can be detected by the R.P.M. sensor 47.

Whether or not the brake pedal (not shown) is depressed can be detected by the brake switch 48; the engine R.P.M. $N_E$ can be detected by the engine R.P.M. sensor 49; the throttle opening $\theta$ can be detected by the throttle opening sensor 50; and the vehicle speed can be detected by the vehicle speed sensor 51.

The aforementioned hydraulic circuit will now be described with references to FIGS. 4 and 5.

Figure 4:
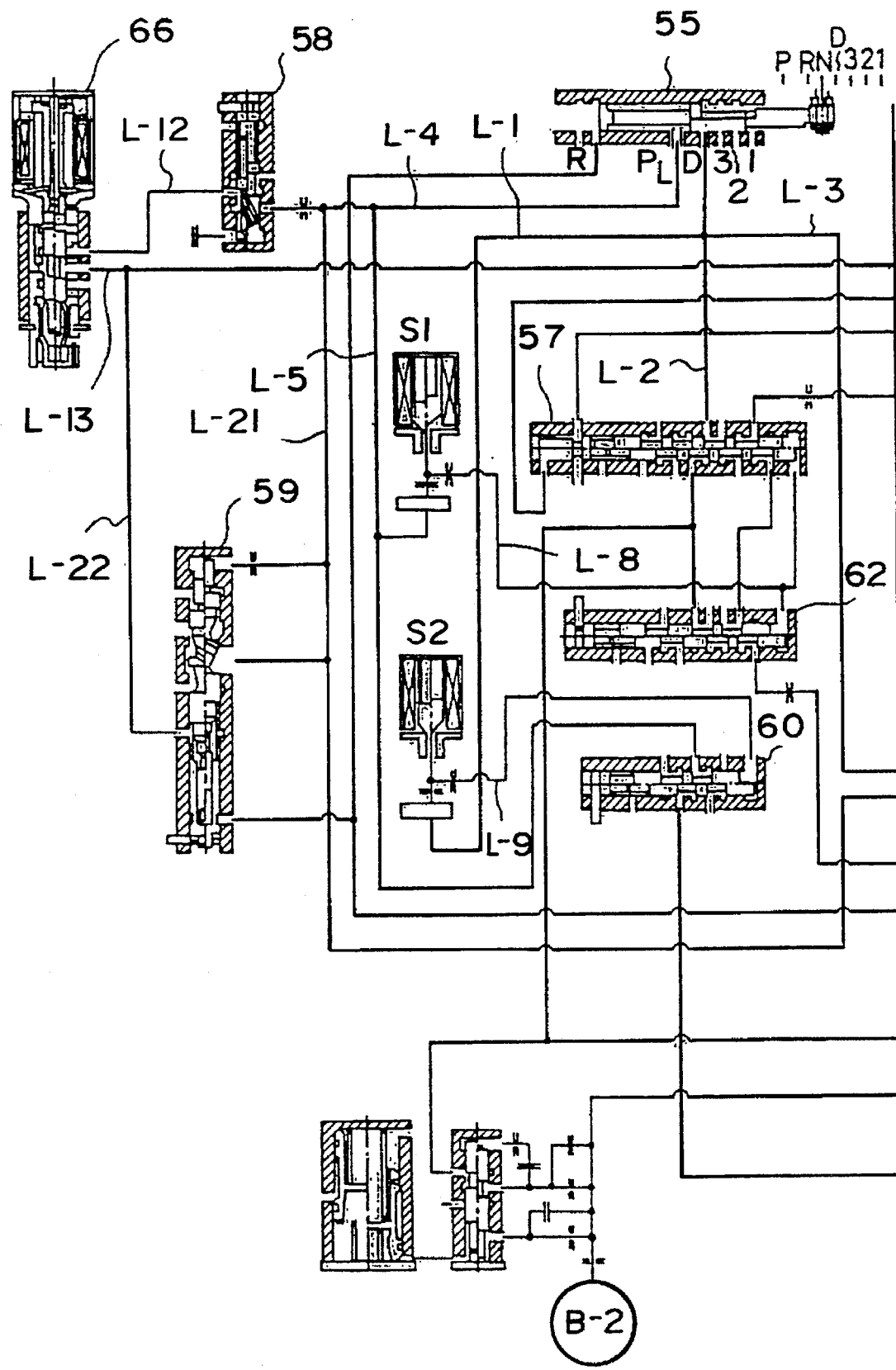
FIG. 4 is a first diagram showing a first part of a hydraulic circuit for control of the automatic transmission according to the embodiment of the present invention.
Figure 5:
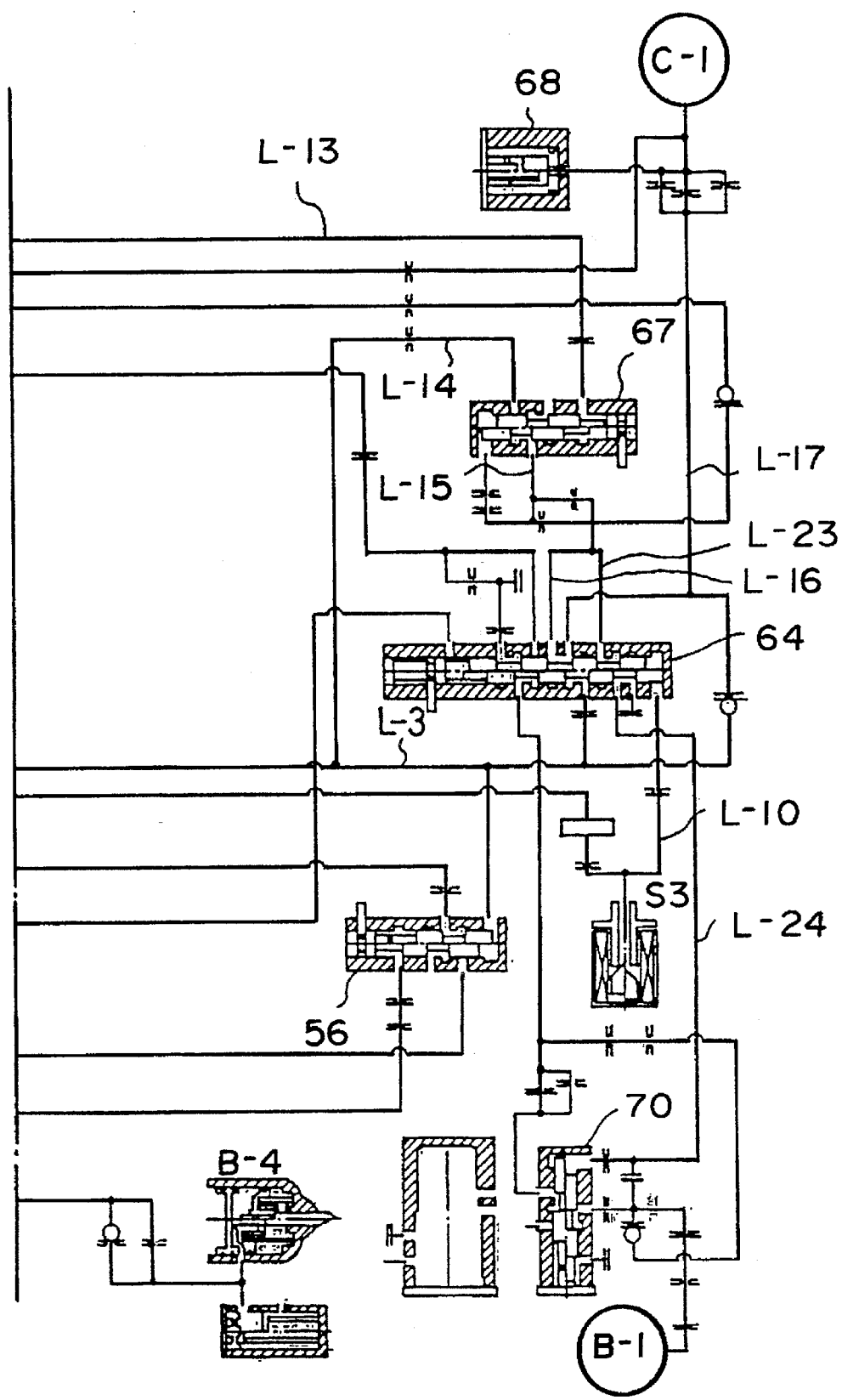
FIG. 5 is a second diagram showing the remainder of the hydraulic circuit of FIG. 4.

As shown in FIGS. 4 and 5, a primary valve 59 regulates the oil pressure coming from the oil pressure source (not shown) and outputs the regulated pressure as line pressure to an oil passage L-21. A manual valve 55 is shown as having ports: 1, 2, 3, D, $P_L$ and R. The line pressure fed from the primary valve 59 to the port $P_L$ via the oil passage L-21 and an oil passage L-4 is established as the 1st-range pressure, the 2nd-range pressure, the 3rd-range pressure, the D-range or forward-range pressure and the R-range pressure at the ports 1, 2, 3, D and R, respectively, by operation of the shift lever (not shown). The D-range pressure oil is fed via an oil passage L-1 to the second solenoid valve S2, via an oil passage L-2 to a 1-2 shift valve 57, and via an oil passage L-3 to a B-1 sequence valve 56. On the other hand, the line pressure from the oil passage L-21 is fed to the third solenoid valve S3 and a solenoid modulator valve 58 and further, via an oil passage L-5, to the first solenoid valve S1 and a 2-3 shift valve 60.

The first solenoid valve S1, the second solenoid valve S2 and the third solenoid valve S3 are turned ON/OFF in response to the signals of the hydraulic control circuit 40 (of FIG. 2) so that the first solenoid valve S1 feeds a signal oil pressure, via an oil passage L-8, to the 1-2 shift valve 57 and a 3-4 shift valve 62, so that the second solenoid valve S2 feeds a signal oil pressure via an oil passage L-9 to the 2-3 shift valve 60, and so that the third solenoid valve S3 feeds a signal oil pressure via an oil passage L-10 to a neutral relay valve 64.

The 1-2 shift valve 57 takes the position permits upper half in FIG. 4 in 1st speed and the lower half position in the 2nd, 3rd and 4th speeds. The 2-3 shift valve 60 takes the position per its lower half in FIG. 4 in the 1st and 2nd speeds and the upper half position in the 3rd and 4th speeds. The 3-4 shift valve 62 takes the position per its upper half shown in FIG. 4 in the 1st and 4th speeds and the lower half position in the 2nd and 3rd speeds. The neutral relay valve 64 takes the position per its upper half shown in FIG. 4 in the neutral control state and the lower half position in the 1st to 4th speeds.

The solenoid module valve 58 is connected via an oil passage L-12 with a linear solenoid valve 66, which, in turn, is connected via an oil passage L-13 with a C-1 control valve 67. The linear solenoid valve is further connected via an oil passage L-22 with the primary valve 59.

In response to a signal from the hydraulic control circuit 40, the linear solenoid valve 66 is controlled to feed a throttle pressure $P_{TH}$ as the control oil pressure to the C-1 control valve 67. This C-1 control valve 67 is fed with the D-range pressure via oil passages L-3 and L-14 so that it regulates the D-range pressure to a pressure $P_{C1}$ (hereinafter "C-1 oil pressure") for operation of hydraulic servo C-1, corresponding to the throttle pressure $P_{TH}$ coming from the linear solenoid valve 66, and feeds the pressure $P_{C1}$ to an oil passage L-15.

The aforementioned neutral relay valve 64 takes the position per its upper half in FIG. 5 in the neutral control state. In this neutral control state, therefore, the C-1 oil pressure $P_{C1}$ established in the oil passage L-15 is fed via an oil passage L-16, the neutral relay valve 64 and an oil passage L-17 to the hydraulic servo C-1. The C-1 oil pressure $P_{C1}$ is further fed via oil passages L-23 and L-24 to a B-1 control valve 70 acting as the oil pressure feeding means 92 (of FIG. 1).

Moreover, the neutral relay valve 64 normally takes the lower half position at the 1st to 4th speeds. As a result, at these 1st to 4th speeds, the D-range pressure oil is fed via the oil passage L-3, the neutral relay valve 64 and the oil passage L-17 to the hydraulic servo C-1. In the neutral control state, moreover, the neutral relay valve 64 is switched to the upper half position to connect the oil passage L-16 and the oil passage L-17.

A damper valve 68 is arranged in the oil passage L-17 for absorbing the pulsations of the C-1 oil pressure $P_{C1}$. B-1, B-2 and B-3 are hydraulic servos for operation of the first brake B1, the second brake B2 and the third brake B3, respectively.

To establish the neutral control state it is first decided whether or not the vehicle has stopped. If the answer is YES, the clutch C1 is gradually released. In the meanwhile, the engine R.P.M. $N_E$ and the clutch input side R.P.M. $N_{C1}$ are monitored to determine when these two values become stable.

When the engine R.P.M. $N_E$ and the clutch input side R.P.M. $N_{C1}$ become stable, it is understood that the first clutch C1 has been released. Therefore, the aforementioned throttle pressure $P_{TH}$ fed from the linear solenoid valve 66 is controlled so that the C-1 oil pressure $P_{C1}$ is increased little by little to gradually apply the first clutch C1.

The applied state of the first clutch C1 is detected in terms of a change in the rotational difference $\Delta N$ between the engine R.P.M. $N_E$ and the clutch input side R.P.M. $N_{C1}$. When there is no change in the rotational difference $\Delta N$, that is, when the first clutch C1 has been released, the C-1 oil pressure $P_{C1}$ is raised to cause application of the first clutch C1. When the rotational difference $\Delta N$ changes, that is, when slipping engagement of the first clutch C1 is started, the C-1 oil pressure $P_{C1}$ is reduced to release the first clutch C1.

By repeating these operations, the hydraulic servo C-1 of the first clutch C1 can restore the state immediately before the start of the slipping engagement with little loss in stroke of the first clutch C1.

As a result, when the accelerator pedal is depressed in the neutral control state to apply the first clutch again, it is possible to prevent, not only the delay in the engagement due to the stroke loss of the first clutch piston, but also the racing of the engine and engaging shock.

Since, the slipping engagement state is not established in the neutral control state, idling vibration does not occur in the vehicle, and the effect of reducing the fuel economy is not lost. Moreover, the frictional member of the first clutch C1 is prevented from generating heat and deterioration.

In the case of the oil pressure fed to the hydraulic servo C-1, there is established a time lag between the throttle pressure $P_{TH}$ instruction to the linear solenoid valve 66 from the hydraulic control unit 40 (of FIG. 2) and the actual oil pressure. In the present embodiment, however, the change in the rotational difference $\Delta N$ is judged at each increment of a predetermined time period by the aforementioned control unit 41 of the automatic transmission so that the throttle pressure $P_{TH}$ is not erroneously further changed during the time lag.

Moreover, while the engine idling R.P.M. is changing, the input side R.P.M. of the torque converter 12 also changes so that the output side R.P.M. of the torque converter 12 also changes accordingly. As a result, in case the change in the rotational difference $\Delta N$ is to be detected, error in detection of the state of engagement of the first clutch C1 due to the change in the idling R.P.M. is avoided.

Figure 6:
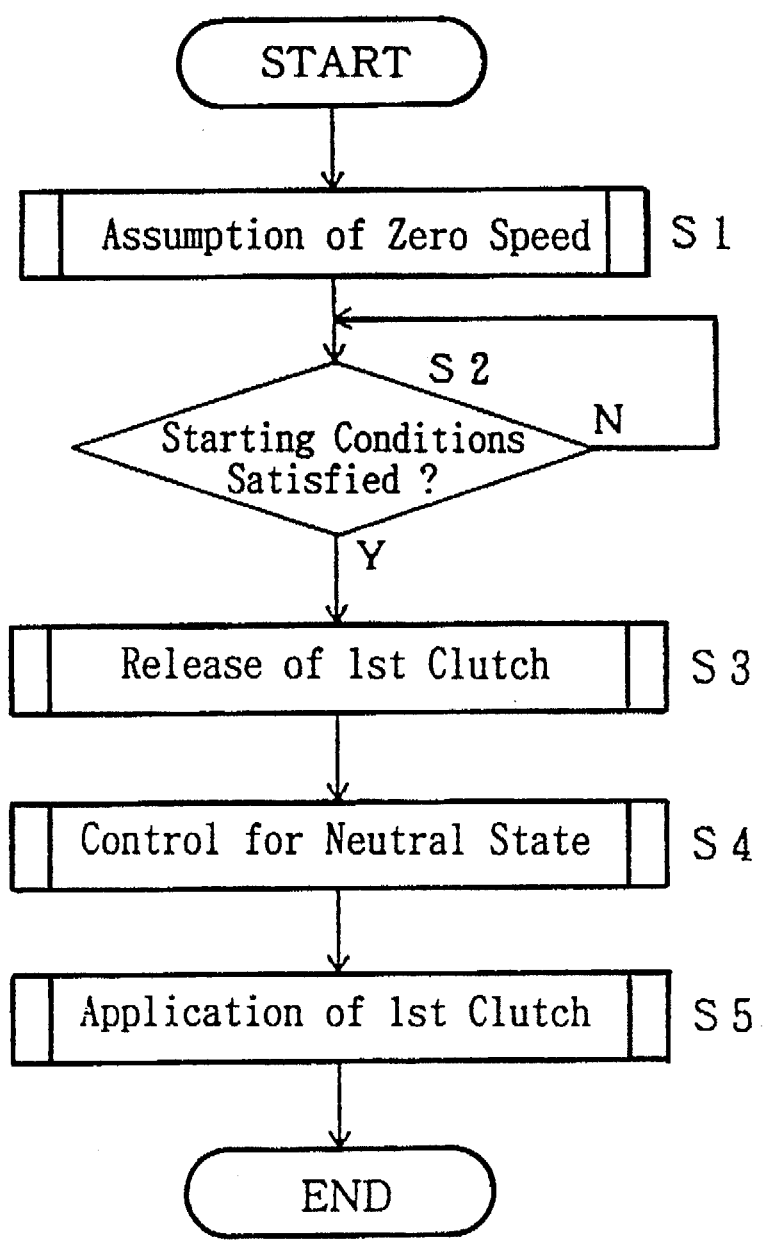
FIG. 6 is a main flow chart showing the operations of an automatic transmission control system according to the embodiment of the present invention.

FIG. 6 is a main flow chart showing the main operations of an automatic transmission control system according to the embodiment of the present invention, and FIG. 16 is a time chart showing the timing of the various operations of the control system of the present invention. In FIG. 6:

Step S1: It is assumed, on the basis of lack of change in the clutch input side R.P.M. $N_{C1}$, that the vehicle speed is zero.

Step S2: When the vehicle is stopped by releasing the accelerator pedal (not shown) and by depressing the brake pedal (not shown), the program awaits the conditions for starting the neutral control state to be satisfied. When satisfied, i.e. when the answer in S2 is YES, the routine advances to Step S3.

The individual conditions which must be satisfied for transition from S2 to S3 are: that the zero assumption for vehicle speed v is ended; that the throttle opening $\theta$ has not exceeded a predetermined value; that the oil temperature detected by the oil temperature sensor 46 has not exceeded a predetermined value; and that the brake switch 48 is ON.

Step S3: The first clutch is released. The C-1 oil pressure $P_{C1}$ is controlled to equal the throttle pressure $P_{TH}$, which is set according to the engine R.P.M. $N_E$ corresponding to the input torque. For this purpose, the C-1 oil pressure $P_{C1}$ is reduced by a first set pressure.

Step S4: Neutral state control is established. Here, the control sequence waits for the engine R.P.M. $N_E$ and the clutch input side R.P.M. $N_{C1}$ to become stabilized. After this stabilization, the C-1 oil pressure $P_{C1}$ is controlled by raising or lowering it by a second set pressure or a third set pressure on the basis of the engine R.P.M. $N_E$ and the clutch input side R.P.M. $N_{C1}$.

Step S5: The first clutch is applied by boosting the C-1 oil pressure $P_{C1}$ by a fourth set pressure which is set on the basis of the throttle opening $\theta$, the engine R.P.M. $N_E$ and so on, to complete the piston stroke of the hydraulic servo C-1 (of FIG. 5). At the end of the piston stroke of the hydraulic servo C-1, the C-1 oil pressure $P_{C1}$ is boosted by a fifth set pressure to prevent application shock.

Figure 7:
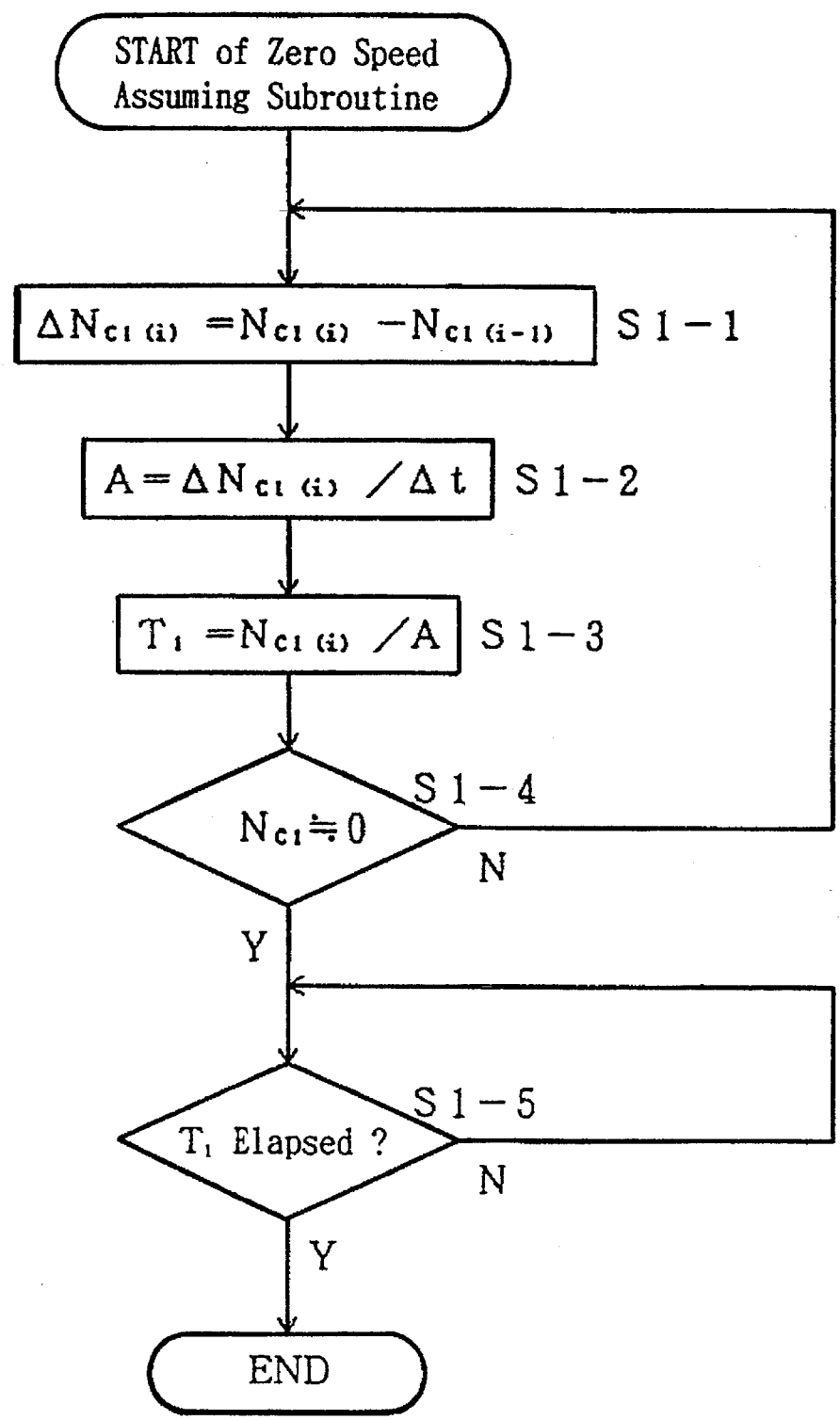
FIG. 7 is a flow chart showing the zero vehicle speed assuming subroutine for step S1 in FIG. 6.

FIG. 7 shows the subroutine of the zero speed assumption of Step S1 of FIG. 6. In FIG. 7:

Step S1-1: An R.P.M. difference $\Delta N_{C1(i)}$ is calculated by subtracting a clutch input side R.P.M. $N_{C1(i-1)}$, at an instant preceding the present time by a period $\Delta t$, from a clutch input side R.P.M. $N_{C1(i)}$ at the present time. In this case, the time period $\Delta t$ is set by a clock in the aforementioned automatic transmission control system 41 so that the clutch input side R.P.M. $N_{C1}$ is detected at each time period $\Delta t$.

Step S1-2: The deceleration A of the vehicle is calculated by dividing the R.P.M. difference $\Delta N_{C1(i)}$ by the time period $\Delta t$.

Step S1-3: The time period $T_1$ for the vehicle to come to a stop is calculated by dividing the clutch input side R.P.M. $N_{C1(i)}$ at the present time by the deceleration A.

Step S1-4: The control system stands by until the clutch input side R.P.M. $N_{C1(i)}$ at the present time becomes so low it cannot be measured, i.e. until the answer is YES. The subroutine then advances to Step S1-5, when the answer is YES. The control routine returns to Step S1-1 so long as the answer is NO.

Step S1-5: It is determined by means of the timer (not shown) if the time period $T_1$ is elapsed. If this answer is YES, it is assumed that the vehicle speed is zero.

Figure 8:
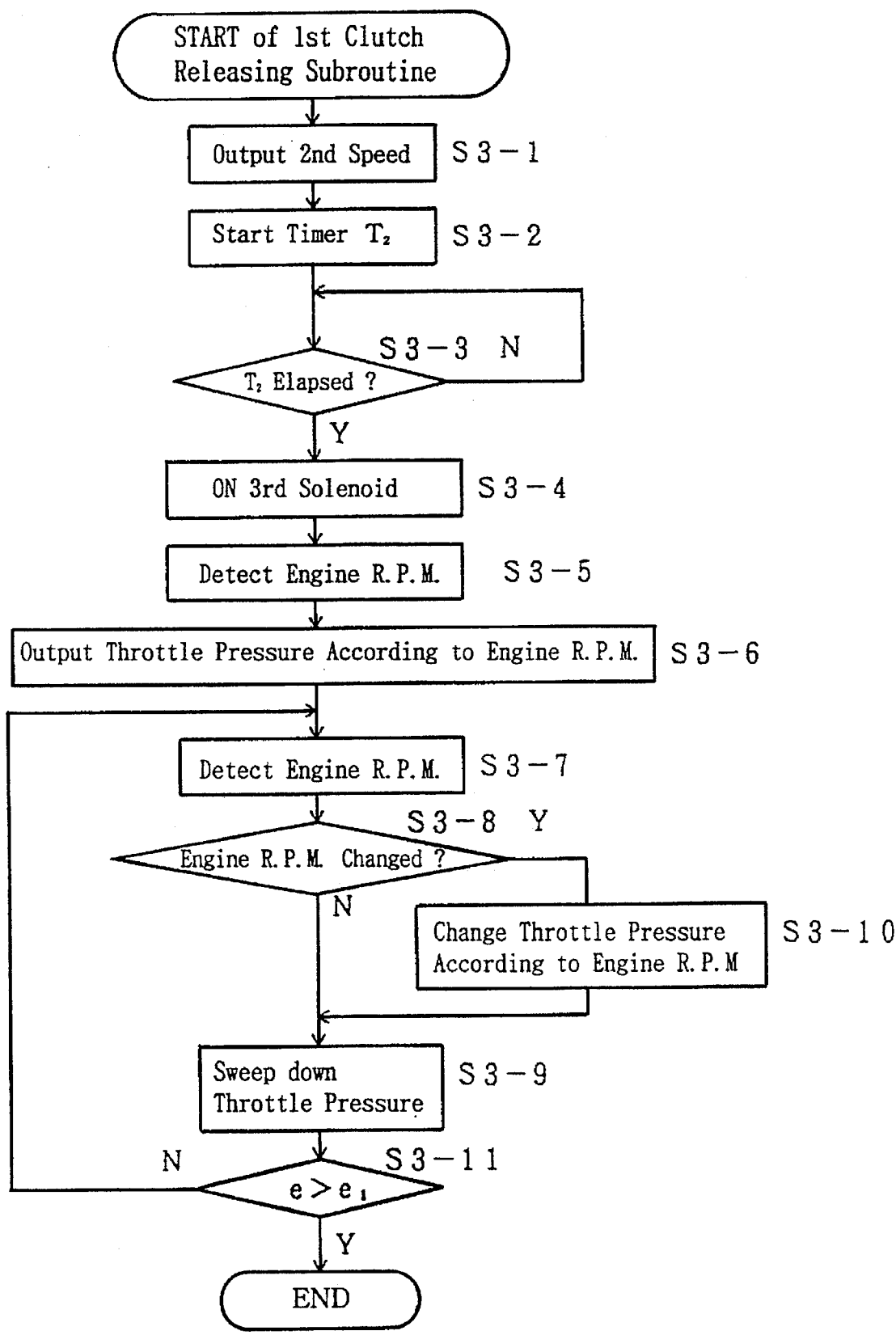
FIG. 8 is a flow chart illustrating the 1st clutch releasing subroutine for step S3 in FIG. 6.

The first clutch releasing subroutine of Step S3 of FIG. 6 will now be described with reference to FIGS. 8 to 11. In FIG. 8:

Step S3-1: After the starting conditions are satisfied, the 2nd speed shifting output is issued to apply the first brake B1 (of FIG. 2) to thereby effect hill-holding.

Step S3-2: The timing of the time period $T_2$ is started by the timer (not shown).

Step S3-3: The control routine awaits the lapse of the time period $T_2$ for application of the first brake B1. This time period $T_2$ has its value set by considering the time lag for lowering the oil pressure of the hydraulic servo C-1 (of FIG. 5), as illustrated in FIG. 10, and the time lag for applying the hydraulic servo B-1. As a result, the first clutch C1 is released after the first brake B1 has been applied, so that shock can be prevented following the shift to thereby effect smooth entry into the neutral control state.

Step S3-4: A signal S3 to the third solenoid valve S3 is turned ON to switch the neutral relay valve 64 to its upper half position in FIG. 5 in which the C-1 oil pressure $P_{C1}$ can be controlled.

Step S3-5: The engine R.P.M. $N_E$ corresponding to the input torque $T_T$ is detected and set to a reference engine R.P.M. $N_{Em}$.

Step S3-6: On the basis of the graph of FIG. 11, the throttle pressure $P_{TH}$ is lowered to the value immediately before the first clutch C1 starts its slipping engagement in accordance with the engine. R.P.M. $N_E$, to thereby lower the C-1 oil pressure $P_{C1}$.

Step S3-7: The engine R.P.M. $N_E$ corresponding to the input torque is again detected.

Step S3-8: It is decided whether or not the engine R.P.M. $N_E$ has changed, as compared with the reference engine R.P.M. $N_{Em}$. The subroutine advances to Step S3-9, if the answer is NO, but to Step S3-10 if YES.

Step S3-9: The throttle pressure $P_{TH}$ or the C-1 oil pressure $P_{C1}$ is reduced (or swept down) by the first set pressure $\Delta P$ for each time period $\Delta t$ corresponding to the engine R.P.M. $N_E$.

Step S3-10: The time period $\Delta t$ and the first set pressure $\Delta P$ are changed according to the reference engine R.P.M. $N_{Em}$. The throttle pressure $P_{TH}$ corresponding to the engine R.P.M. $N_E$ at this time is determined from the graph of FIG. 11. If the throttle pressure $P_{TH}$ is lower than the C-1 oil pressure $P_{C1}$ at this time, its setting is changed. Then, the engine R.P.M. $N_E$ is set to the reference engine R.P.M. $N_{Em}$ at this time.

Step S3-11: After the first clutch C1 has started to slip, release of the first clutch C1 is delayed until a speed ratio e, as defined by the following formula, exceeds a constant $e_1$:

$$e = N_{C1}/N_E.$$

When the speed ratio e exceeds the constant $e_1$, the pressure reduction of Step S3-9 is interrupted. The constant $e_1$ is set to 0.75, for example, by considering the delay in the change of the engine R.P.M. $N_E$ from the control of the oil pressure at the time when the first clutch C1 is released. Incidentally, the speed ratio e may be replaced by the clutch input side R.P.M. $N_{C1}$.

The application of the first clutch C1 cannot be detected solely by monitoring changes in the rotational difference $\Delta N$ because this rotational difference $\Delta N$ does not change no matter whether the first clutch C1 might be completely applied or released. This makes it difficult to discriminate between the state in which the first clutch C1 is completely applied, and the state in which the first clutch C1 is released. Therefore, the state immediately before the application of the first clutch C1 is started is established without fail by awaiting the speed ratio e to exceed the constant $e_1$.

Figure 9:
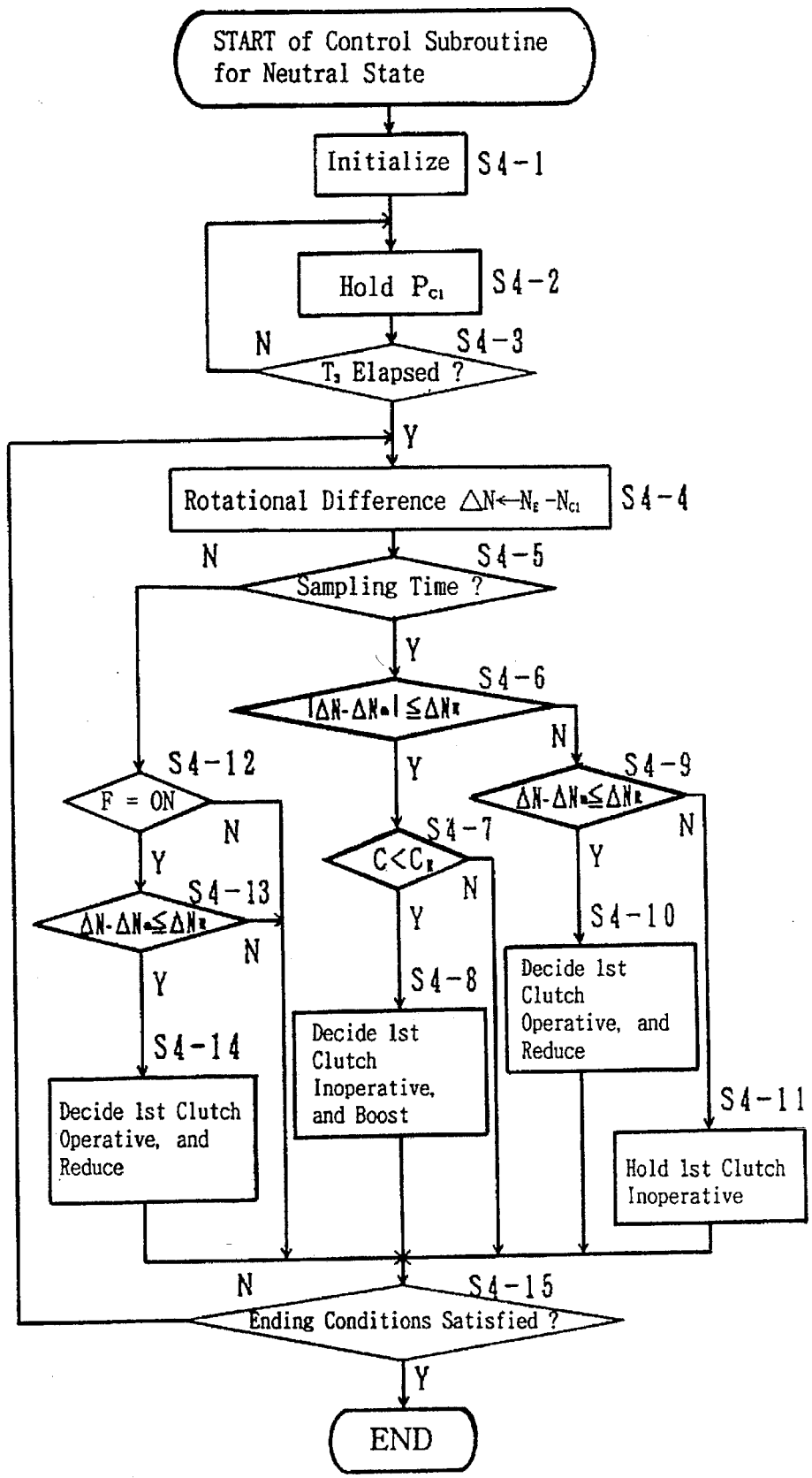
FIG. 9 is a flow chart showing a subroutine for neutral state control for step S4 in FIG. 6.

The subroutine of Step S4 of FIG. 6 for controlling the neutral state will now be described with reference to FIGS. 9–13. Incidentally, FIG. 12 plots the rotational difference $\Delta N$ and the (dragging) toque against the piston stroke. In FIG. 9:

Step S4-1: The initial values of a hydraulic control flag F, the counted value C of the counter (not shown) and the reference rotational difference $\Delta N_m$ are set as follows:

F←OFF;

C←0; and $\Delta N_m$←the value $(N_E - N_{C1})$ at this time.

Steps S4-2 and S4-3: The C-1 oil pressure $P_{C1}$ is held at the final value in the first clutch releasing subroutine. If a decision whether or not the rotational difference $\Delta N$ has changed is made immediately after confirmation that the first clutch C1 has released to a predetermined state, the decision would be subject to error due to the change in the rotational difference $\Delta N$ which, in turn, is due to the pressure reduction in the first clutch releasing subroutine. By using the timer (not shown), therefore, the C-1 oil pressure $P_{C1}$ is held until a time period $T_3$ has elapsed. As a result, the decision of whether or not the rotational difference $\Delta N$ has changed is delayed to prevent unstable control of the C-1 oil pressure $P_{C1}$ immediately after the first clutch C1 has been released.

Step S4-4: The rotational difference $\Delta N$ between the engine R.P.M. $N_E$ and the clutch input side R.P.M. $N_{C1}$ is calculated.

Step S4-5: It is decided whether or not a predetermined sampling time has been reached, that is, whether or not a time period such as 1.0 sec. or 0.5 sec. has elapsed. The subroutine advances to Step S4-6, if the answer is YES, and to Step S4-12 if NOT.

Step S4-6: It is decided whether or not the absolute value of 5 the difference between the rotational difference $\Delta N$ and the reference rotational difference $\Delta N_m$ is no more than a preset value $\Delta N_R$, that is, whether or not the change in the rotational difference ΔN is no more than the preset value ΔN$_R$. The subroutine advances to Step S4-7, if the answer is YES, and to Step S4-9 if NO. The set value ΔN$_R$ is preset to discriminate between the operative state and the inoperative state of the first clutch C1, as shown in FIG. 12.

If the detections of the input side R.P.M. sensor and output side R.P.M. sensor (neither is shown) or the calculation of the rotational difference ΔN is erroneous, it may be erroneously decided that the rotational difference ΔN has changed. Noting that the rotational difference ΔN abruptly changes if the application of the first clutch C1 is started from the state immediately before the application, therefore, it is decided that the rotational difference ΔN has changed if the change in the rotational difference ΔN exceeds the set value N$_R$. Then, it is possible to prevent an erroneous decision of whether or not the rotational difference ΔN has changed.

If, moreover, the set value ΔN$_R$ is changed according to the oil temperature, the C-1 oil pressure P$_{C1}$ can be excellently controlled regardless of whether the oil is hot or cold.

Step S4-7: It is decided whether or not the counted value C of the counter is smaller than a set value C$_R$. The subroutine advances to Step S4-8, if the answer is YES, and to Step S4-15 if NO.

Step S4-8: It is decided that the first clutch C1 is in the inoperative state, because there is no change in the rotational difference ΔN. Since, in this state, the clutch piston may have excessively returned, the C-1 oil pressure P$_{C1}$ is boosted by a set pressure ΔP$_{UP}$ in the following manner, as illustrated in FIG. 13:

P$_{C1}$←P$_{C1}$+ΔP$_{UP}$.

Moreover, the rotational difference ΔN is set to the reference rotational difference ΔN$_m$, and the flag F is turned ON, as follows:

ΔN$_m$←ΔN; and

F←ON.

Step S4-9: It is decided whether or not there is a tendency in the change in the rotational difference ΔN to decrease, that is, whether or not the difference between the rotational difference ΔN and the reference rotational difference ΔN$_m$ is no more than the set value ΔN$_R$. The subroutine advances to Step S4-11, if the answer is YES, and to Step S4-10 if NO.

Step S4-10: It is decided if the first clutch C1 is moving from the inoperative state to the operative state, and, if so, the pressure-reducing means (of FIG. 1) reduces the C-1 oil pressure P$_{C1}$ by the third set pressure ΔP$_{DOWN}$, as follows:

P$_{C1}$←P$_{C1}$−ΔP$_{DOWN}$.

Moreover, the rotational difference ΔN is set to the reference rotational difference ΔN$_m$; the flag F is turned OFF; and the value "1" is subtracted from the counted value of the counter. Moreover, the C-1 oil pressure P$_{C1}$ at this instant is set as the reference C-1 oil pressure P$_{C1m}$, as follows:

ΔN$_m$←ΔN;

F←OFF;

C←C−1 (wherein C=0 if C<0); and

P$_{C1m}$←P$_{C1}$.

Step S4-11: Since it can be decided that the first clutch C1 is changing from the operative state to the inoperative state, the C-1 oil pressure P$_{C1}$ is held at the value at this instant, and the flag F is turned OFF, as follows:

F←OFF.

In other words, in case the first clutch C1 is changing from the operative state to the inoperative state, the rotational difference ΔN decreases. If, at this time, the C-1 oil pressure P$_{C1}$ is further lowered, the clutch piston may be abruptly retracted with excessive stroke loss. In case, therefore, the first clutch C1 is changing from the operative state to the inoperative state, reduction of the C-1 oil pressure P$_{C1}$ is inhibited and P$_{C1}$ is held at the value of that instant.

Step S4-12: It is decided whether or not the flag F is ON, that is, whether or not the C-1 oil pressure P$_{C1}$ was boosted at the previous sampling time. The subroutine advances to Step S4-13, if the flag F is ON, and to Step S4-15 if OFF.

Step S4-13: Since the C-1 oil pressure P$_{C1}$ was boosted at the previous sampling time, it is decided whether or not the difference obtained by subtracting the rotational difference ΔN from the reference rotational difference ΔN$_m$ is no more than the set valve ΔN$_R$. The subroutine advances to Step S4-14 if the answer is YES, and to Step S4-15 if NO.

Step S4-14: Since the C-1 oil pressure P$_{C1}$ was boosted at the previous sampling time, the rotational difference ΔN has changed. Hence, it is decided that the first clutch C1 is applied, and the C-1 oil pressure P$_{C1}$ is reduced by the set pressure ΔP$_{DOWN}$, as follows:

P$_{C1}$←P$_{C1}$−ΔP$_{DOWN}$.

Moreover, the rotational difference ΔN is set to the reference rotational difference ΔN$_m$, the flag F is turned OFF and the counted value of the counter is incremented by "1". Then, as at Step S4-10, the C-1 oil pressure P$_{C1}$ at this instant is set as the reference C-1 oil pressure P$_{C1m}$, as follows:

ΔN$_m$←ΔN;

F←OFF;

C←C+1; and

P$_{C1m}$←P$_{C1}$.

As described above, it is decided whether or not the rotational difference has changed at each sampling time. If the C-1 oil pressure P$_{C1}$ is boosted according to that decision, the application of the first clutch C1 may be instantly started to provide slipping engagement to start the transmission of torque but with generation of idling vibration. If, therefore, the rotational difference ΔN increases while the first clutch C1 is starting to engage, the C-1 oil pressure P$_{C1}$ is lowered without awaiting the next sample time. Thus, the first clutch C1 can be prevented from coming into slipping engagement, thereby preventing the idling vibration.

As described above, moreover, the C-1 oil pressure P$_{C1}$ is changed only if the change in the rotational difference ΔN is higher than the set value ΔN$_R$ at each sampling time. If, in this case, the rotational difference ΔN changes little by little, for example, the C-1 oil pressure P$_{C1}$ may not be changed although the first clutch C1 has already come into the engaging state. By updating the reference rotational difference $\Delta N_m$ only when the C-1 oil pressure $P_{C1}$ is changed, therefore, this change of the C-1 oil pressure $P_{C1}$ can be ensured in case the rotational difference $\Delta N$ is changed little by little so that the first clutch C1 comes into the engaging state.

Step S4-15: It is decided whether or not the ending conditions for the neutral state of the first clutch C1 are satisfied. This neutral condition controlling subroutine is ended, if the answer is YES. If NO, the subroutine returns to Step S4-4, and the aforementioned steps are repeated.

Figure 15:
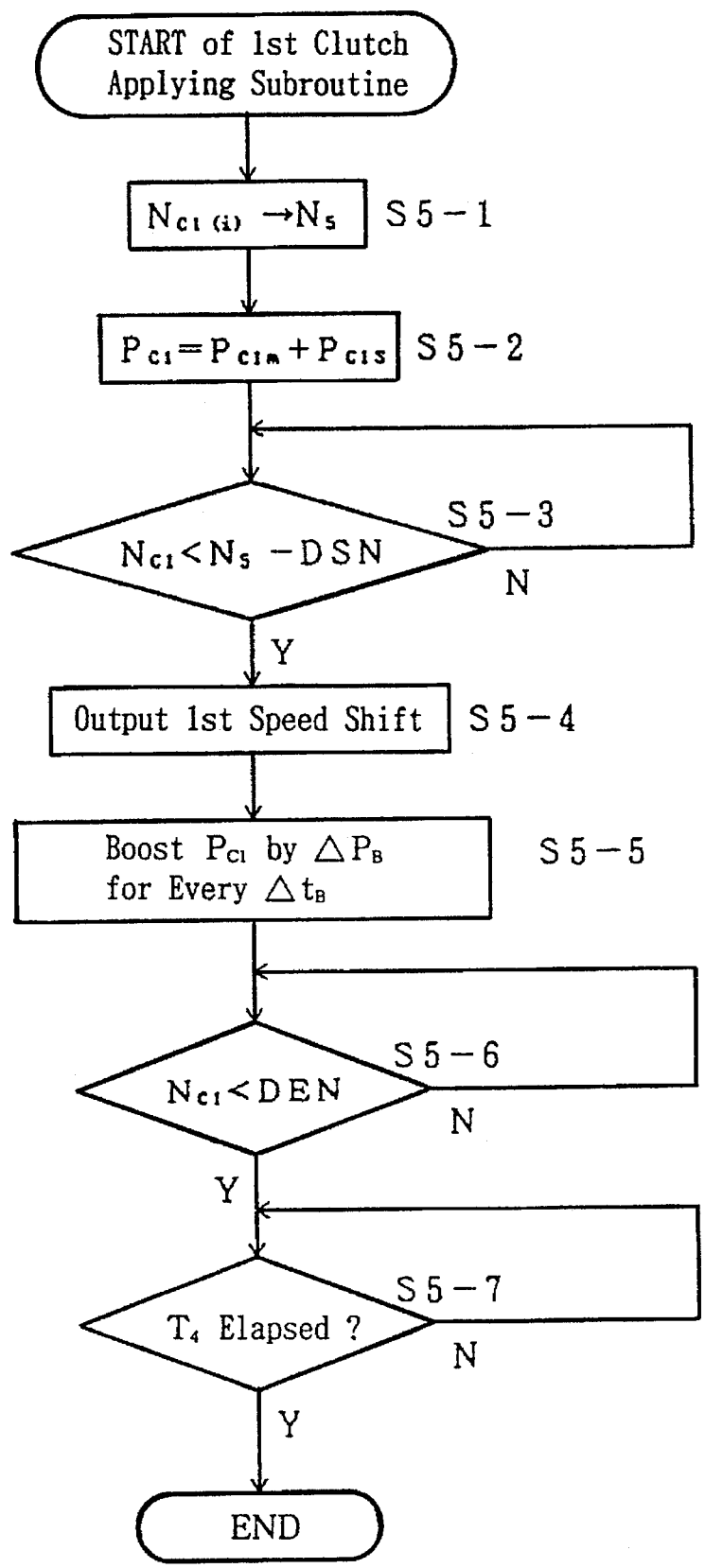
FIG. 15 is a flow chart of a 1st clutch applying subroutine for step S5 in FIG. 6.

With reference to FIGS. 14 to 15, here will be described the subroutine of Step S5 of FIG. 6 for applying the first clutch. Incidentally, FIG. 14 plots the set value against the throttle opening θ. In FIG. 15:

Step S5-1: The clutch input side R.P.M. $N_{C1}$ at the instant of the end of the neutral state control is stored as a value $N_S$ in the memory (not shown) the automatic transmission control system 41 (of FIG. 2).

Step S5-2: A constant $P_{C1s}$ is added to the reference C-1 oil pressure $P_{C1m}$ set at Steps S4-10 and S4-11, and the sum is set as the C-1 oil pressure $P_{C1}$. Incidentally, the constant $P_{C1S}$ is set to a value to ensure a stroke of the piston (not shown) of the hydraulic servo C-1 (of FIG. 5) and to minimize the shock from the engagement.

Step S5-3: The control routine waits until the clutch input side R.P.M. $N_{C1}$ becomes smaller than the difference of the value $N_S$ subtracted from a constant DSN. When the clutch input side R.P.M. $N_{C1}$ is smaller than that difference, it is decided to start application of the first clutch C1, and the subroutine advances to Step S5-4.

Step S5-4: The 1st speed shifting output is .generated.

Step S5-5: The signal oil pressure $P_M$ from the linear solenoid valve 66 (of FIG. 4) is changed, and the C-1 oil pressure $P_{C1}$ is boosted to a pressure $P_B$. After this, the C-1 oil pressure $P_{C1}$ is boosted by the fourth set pressure $\Delta P_B$ for every lapse of a time period $\Delta t_B$ to thereby continue the application of the first clutch C1.

Step S5-6: The control routine waits until the clutch input side R.P.M. $N_{C1}$ becomes lower than the constant DEN.

Step S5-7: A timer (not shown) is used to determine elapse of a time period $T_4$.

In this case, the aforementioned set values such as the constant $P_{C1S}$, the pressure $P_B$ and the set pressure $\Delta P_B$ are set on the basis of a variable such as the throttle opening θ corresponding to the input torque $T_T$.

The hill-holding control is carried out at Step S3-1 of the first clutch releasing subroutine of FIG. 8. For this hill-holding, the sun gear $S_1$ is fixed by applying the first brake B1 (of FIG. 2), so that reverse rotation which might otherwise be transmitted from the drive shafts 27 and 28 through the carrier $CR_1$ is blocked by the second one-way clutch F2.

If, however, the accelerator pedal, for example, is depressed to start the vehicle, while in the hill-holding control, the first clutch applying subroutine of FIG. 15 is started to release the hill-holding control at Step S 5-4 and to thereby apply the first clutch C1 at Steps S5-5 to S5-7.

Because the state in which the reverse motion of the vehicle is blocked by the hill-holding control is abruptly changed to a state in which the blocking force is removed, the vehicle may roll backward against the will of the driver if an attempt is made to start uphill on a steep incline.

Figure 17:
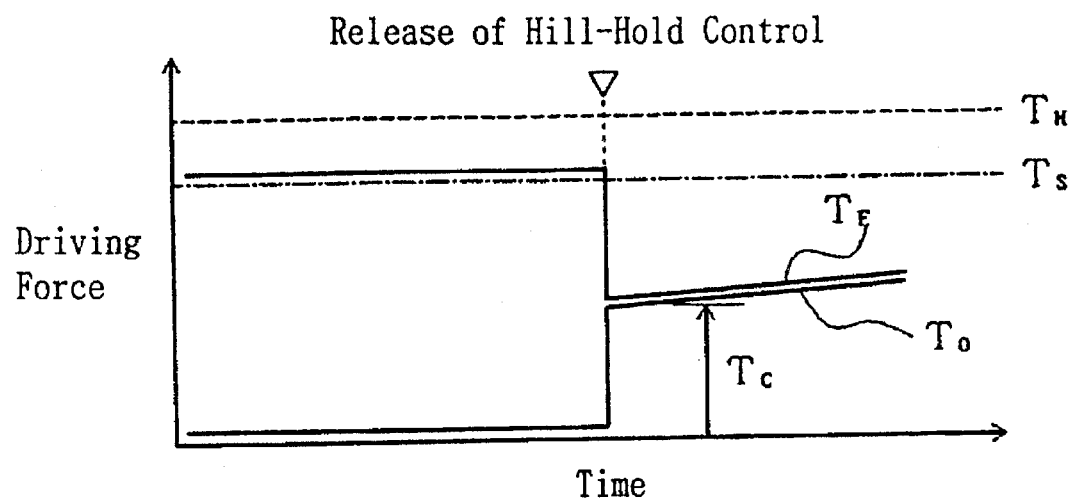
FIG. 17 is a first time chart illustrating the driving force before and after the hill-holding control is released.
Figure 18:
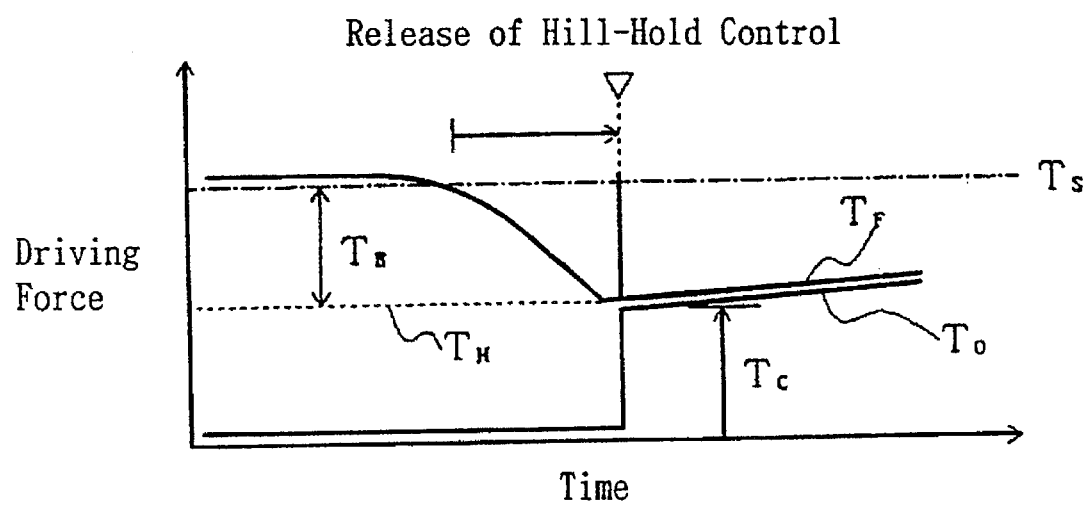
FIG. 18 is a second time chart illustrating the driving force before and after the hill-holding control is released.
Figure 19:
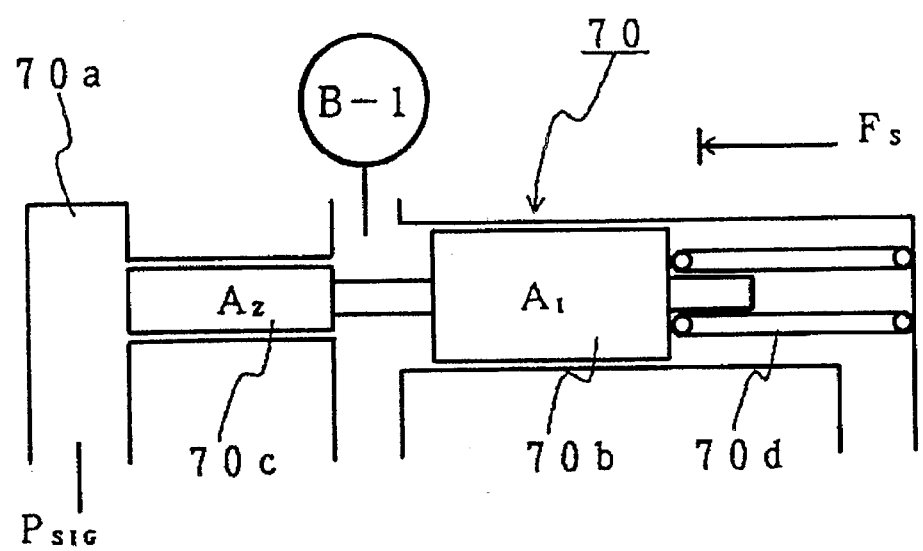
FIG. 19 is an enlarged schematic diagram showing a B-1 modulator valve.

The relation of the driving force before and after the release of the hill-holding control will now be described with reference to FIGS. 17–19. In FIGS. 17 and 18 the force to be generated by the hill-holding control to resist the gravity component tending to move the vehicle backward, down the gradient (hereinafter the "hill-holding force") is designated $T_H$, and that gravity component, the backward force, is designated $T_S$. The gradient resistance is designated $T_F$, the output torque from the transmission 16 (of FIG. 2) is designated $T_O$, and the forward driving force (hereinafter "creep force") of the engine 10 at idle in the forward 1st speed is designated $T_C$.

The relationship of the hill-holding force $T_H$, the backward force $T_S$ and the creep force $T_C$ are:

$$T_H > T_S > T_C,$$

and in hill-holding control, the reverse motion off the vehicle is prevented by the reaction force which is generated as a result of the application of the first brake B1, so that the following relation holds:

$$T_F = T_S.$$

When the hill-holding control is released, the vehicle loses the aforementioned reaction force so that it moves backward as follows:

$$T_F = T_C < T_S.$$

Since, in this case, the gradient resistance $T_F$ is equal to the output torque $T_O$, the vehicle moves backward until the output torque $T_O$ exceeds the backward force $T_S$. Moreover, because the reaction force is abruptly lost, the driver feels this loss when starting.

On the other hand, where:

$$T_S > T_H > T_C,$$

the reverse movement of the vehicle cannot be blocked by the reaction force which is generated during the hill-holding control as a result of the application of the first brake B1. If the foot brake force is designated as $T_B$, the following relationship holds so that the reverse movement of the vehicle is blocked by the sum of the hill-holding force $T_H$ and the foot brake force $T_B$:

$$T_F = T_H + T_B = T_S.$$

When the driver releases the brake pedal to reduce the foot brake force $T_B$ before he depresses the accelerator pedal, the vehicle runs backward:

$$T_F = T_H + T_B < T_S.$$

In this case, the driver feels a slight reverse movement of the vehicle and can depress the accelerator pedal to compensate.

In the neutral control state, therefore, a B-1 modulated pressure $P_{B1}$ is fed to the hydraulic servo B-1 so as to establish in the first brake B1 a B-1 torque capacity $T_{BIC}$ which corresponds to the forward driving force generated with the engine 10 idling in the forward 1st speed, i.e., the creep force $T_C$.

Thus, the creep force $T_C$ may be defined as a forward driving force which is generated with the engine 10 idling in forward 1st speed. Moreover, the torque converter 12 has its turbine torque $T_T$ expressed by the following formula wherein C is a capacity coefficient, $N_E$ is the engine R.P.M. and t is the torque ratio:

$$T_T = C \cdot N_E^2 \cdot t \quad (1).$$

Incidentally, the engine R.P.M. $N_E$ is the value at idle, and the capacity coefficient C and the torque ratio t are the values when the vehicle is stopped.

At this time, the output torque $T_O$ is expressed by the following formula:

$$T_O = i_{1st} \cdot T_T.$$

wherein $i_{1st}$ is the gear ratio at 1st speed. Hence, the creep force $T_C$ is expressed by the following formula:

$$T_C = i_{1st} \cdot C \cdot N_E^2 \cdot t \quad (2)$$

Because the hill-holding force $T_H$ is generated by applying the first brake B1 to establish a 2nd speed state, the output torque $T_O$ may be expressed by the following formula:

$$T_O = i_{2nd} \cdot T_T \quad (3).$$

Wherein $i_{2nd}$ is the gear ratio at 2nd speed. The proportion of torque borne by B1, as determined by the gear ratio $i_{2nd}$, is designated as $D_{B1}$:

$$T_B 1 = D_{B1} \cdot T_T \quad (4).$$

The output torque $T_O$ at the time when the regulated B-1 modulated pressure $P_{B1}$ is fed to the hydraulic servo B-1 of the first brake B1, derived from the formulas (3) and (4), is as follows:

$$T_O = i_{2nd} \cdot T_{B1} / D_{B1}.$$

The hill-holding force $T_H$ at this time is expressed by the following formula:

$$T_H = i_{2nd} \cdot T_{B1} / D_{B1} \quad (5)$$

The B-1 modulated pressure $P_{B1}$ for establishing in the first brake B1 the B-1 torque capacity $T_{B1C}$ corresponding to the creep force (i.e., the forward driving force to be generated in the idling state of the engine 10 at the forward 1st speed) $T_C$ is calculated as follows, rearranging formula (5):

$$T_C = i_{2nd} T_{B1} / D_{B1},$$

and the B-1 torque capacity $T_{B1C}$ corresponding to the creep force $T_C$ is expressed by the following formula:

$$T_{B1C} = D_{B1} \cdot T_C \cdot i_{2nd} \quad (6)$$

The B-1 torque capacity $T_{B1C}$ may also be expressed by the following formula, wherein $A_{B1}$ is the piston area of the first brake B1, $F_{SP}$ is the coefficient of friction of the first brake B1, $R_e$ is the effective radius of the first brake B1, and N is the number of plates:

$$T_{B1C} = 2N \cdot R_e \cdot \mu \cdot (A_{B1} \cdot P_{B1} - F_{SP}) \quad (7).$$

Hence, the B-1 modulated pressure $P_{B1}$ derived from the formulas (6) and (7), is expressed by the following formula:

$$P_{B1} = (D_{B1} \cdot T_C / i_{2nd} + F_{SP}) / 2N \cdot R_e \cdot \mu \cdot A_{B1} \quad (8).$$

In the present embodiment, the B-1 modulated pressure $P_{B1}$ is generated by the B-1 modulator valve 70, and a control oil pressure $P_{SIG}$ is fed to the control oil chamber 70a of the B-1 modulator valve 70.

Moreover, the control oil pressure $P_{SIG}$ is generated by the aforementioned neutral relay valve 64. Specifically, when the neutral relay valve 64 takes its upper half position to establish the neutral control state, the B-1 modulator valve 70 is used for the hill-holding control so that the C-1 oil pressure $P_{C1}$ is fed as the control oil pressure $P_{SIG}$ via the oil passage L-24 to the control oil chamber 70a of the B-1 modulator valve 70.

If $A_1$ is the effective area of a first pressure receiving face of larger-diameter portion 70b of the spool of the B-1 modulator valve 70 and $A_2$ is the effective area of a second pressure receiving face of its smaller-diameter portion 70c, and if $F_S$ is the force of a spring 70d then:

$$(A_1 - A_2) P_{B1} - A_2 \cdot P_{C1} = F_S.$$

Accordingly, the B-1 modulated pressure $P_{B1}$ may be expressed:

$$P_{B1} = (F_S - A_2 \cdot P_{C1}) / (A_1 - A_2) \quad (10),$$

or $$P_{B1} = F_S / (A_1 - A_2) - A_2 \cdot P_{C1} / (A_1 - A_2).$$

If, in this case, the vehicle is started, the C-1 oil pressure $P_{C1}$ rises so that the creep force $T_C$ is established as a result of the application of the first clutch C1. As a result, the timings for applying the first clutch C1 and for releasing the first brake B1 can be synchronized simply by using the C-1 oil pressure $P_{C1}$ as the control oil pressure $P_{SIG}$ and by interrupting the feed of the oil pressure to the hydraulic servo B-1.

Moreover, when the C-1 oil pressure $P_1$ increases, the B-1 modulated pressure $P_{B1}$ decreases so that the hill-holding force $T_H$ can be reduced according to the increase in the output torque $T_O$ as a result of the application of the first clutch C1, to stabilize the hill-holding force $T_H$.

On the other hand, if the first brake B1 is used for engine braking, the neutral relay valve 64 takes its lower half position so that the control oil pressure $P_{SIG}$ is reduced to "0" to drain the control oil chamber of the B-1 modulator valve 70. In this case, the following formula holds:

$$(A_1 - A_2) P_{B1} = F_S,$$

so that the B-1 modulated pressure $P_{B1}$ is expressed by the following formula:

$$P_{B1} = F_S / (A_1 - A_2) \quad (11).$$

Thus, the effective area $A_1$ of the larger-diameter portion 70b and the effective area $A_2$ of the smaller-diameter portion 70c of the spool of the B-1 modulator valve 70, determine the B-1 modulated pressure $P_{B1}$ in hill-holding and in engine braking.

Thus, for hill-holding on an incline where the ordinary creep force (forward driving force of the engine 10 idling in forward 1st speed), i.e. a resistance as high as that when the first clutch C1 is applied, is sufficient, the driver will not feel reverse motion. On the other hand, when the vehicle is to be started on a steep uphill; the resistance corresponding to the ordinary creep force $T_C$ with the first clutch C1 being applied is likewise established in the first brake B1 against the reverse force on the vehicle. However, if, in this case, the driver reduces the braking force $T_B$ of the foot brake, brake B1 is brought into slipping engagement to allow the vehicle to move backward. Thus, the driver will be induced to increase the braking force $T_B$ against that reverse motion. As a result, the driver clearly recognizes the need to increase the depression of the accelerator pedal for starting the vehicle, so that the vehicle is prevented from rearward motion contrary to the will of the driver.

The B-1 modulator valve 70 feeds the hydraulic servo B-1 with both the B-1 modulated pressure $P_{B1}$ for establishing the resistance corresponding to the creep force $T_C$ and the oil pressure necessary for engine braking.

When the engine braking is to be effected by applying the first brake B1 at a gear stage higher than that of the 1st speed, it is usually sufficient to feed a relatively low oil pressure to the first brake B1 by means of B-1 modulator valve 70. Accordingly, the hydraulic control unit 40 can be reduced in size by utilization of the B-1 modulator valve 70.

In the present embodiment, the C-1 oil pressure $P_{C1}$ is fed as the control oil pressure $P_{SIG}$ to the control oil chamber 70a so that the B-1 modulator valve 70 may be used for the hill-holding function. However, the signal oil pressure generated by the third solenoid valve S3 for establishing the neutral state can be fed as the control oil pressure $P_{SIG}$ to the control oil chamber 70a.

Moreover, in order that the B-1 modulator valve 70 may be used for the hill-holding function, the D-range pressure can also be fed as the control oil pressure $P_{SIG}$ to the control oil chamber 70a.

Figure 20:
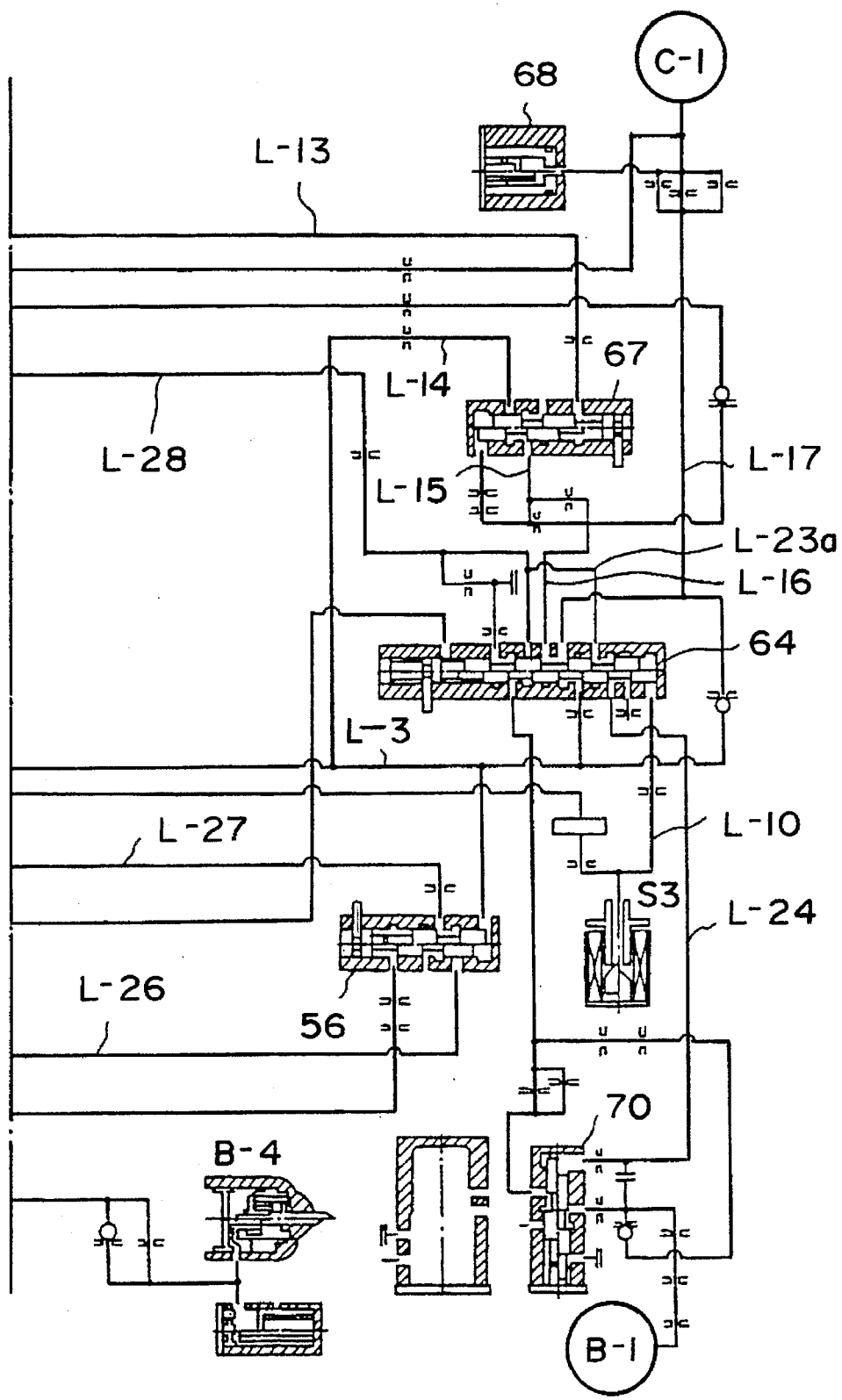
FIG. 20 is a diagram showing another hydraulic control circuit in accordance with the present invention.

FIG. 20 is a diagram showing another hydraulic circuit in accordance with the present invention. Incidentally, the left-hand side hydraulic circuit of FIG. 20 is identical to that shown in FIG. 4. Moreover, description of components having the same construction as that in FIG. 5 will be omitted.

As shown, the D-range pressure generated in the manual valve 55 is fed via the oil passage L-2 to the 1-2 shift valve 57. This 1-2 shift valve 57 is in its lower half position in the neutral state so that the D-range pressure is further fed via the oil passage L-26 to the B-1 sequence valve 56.

The D-range pressure thus fed to the B-1 sequence valve 56 is fed via the oil passage L-27 to the 3-4 shift valve 62. This 3-4 shift valve 62 takes its lower half position in the pseudo-neutral state so that the D-range pressure is fed through the 1-2 shift valve 57 and via oil passages L-28 and L-23a to the neutral relay valve 64.

In the neutral control state, the neutral relay valve 64 takes its upper half position so that the D-range pressure fed thereto is fed as the control oil pressure $P_{SIG}$ to a control oil chamber 70a (of FIG. 19) of the B-1 modulator valve 70.

The present invention should not be considered limited to the foregoing embodiments but can be modified in various manners according to the gist thereof, and these modifications should not be excluded from the scope of the present invention.

What is claimed is:

1. A method for controlling an automatic transmission in a drive train of a vehicle including an engine, the automatic transmission having an output shaft, a fluid coupling for transmitting rotation from the engine to the transmission, a first clutch applied when a forward running range is selected, a second, one-way clutch which is applied when the first clutch is applied, to establish a forward 1st speed; a brake for locking the one-way clutch, when applied, to block reverse rotation of the output shaft of the transmission, a first hydraulic servo for receiving oil pressure to apply the first clutch; and a second hydraulic servo for receiving oil pressure to engage the brake, said method comprising:

responsive to selection of a forward running range with the vehicle stopped, throttle opening for the engine at idle and a foot brake engaged, lowering oil pressure to the first hydraulic servo to a pressure below the oil pressure received by the first hydraulic servo at 1st speed and raising oil pressure of the second hydraulic servo to a modulated pressure, said modulated pressure generating, against the reverse force on the vehicle facing uphill on an incline, a resistance force corresponding to the forward driving force of the engine idling in 1st speed, thereby establishing a neutral control state with hill-holding.

2. A method for controlling an automatic transmission according to claim 1 wherein said lowering of the oil pressure to the first hydraulic servo is controlled in accordance with engine R.P.M.

3. A method for controlling an automatic transmission according to claim 1 further comprising:

raising the oil pressure to said first hydraulic servo to engage said first clutch responsive to an increase in throttle opening and releasing the oil pressure to said second hydraulic servo responsive to said raising of oil pressure to said first hydraulic servo, thereby ending said neutral control state and starting forward running of the vehicle.

4. A method according to claim 1 wherein said lowering of oil pressure to said first hydraulic servo is started after start of said raising of oil pressure to said second hydraulic servo.

5. A method according to claim 1 wherein said lowering releases said first clutch after said raising has applied said brake.

6. A method according to claim 1 wherein said modulated pressure to said second hydraulic servo is modulated responsive to the oil pressure to said first hydraulic servo.

7. A control system for an automatic transmission in a vehicle drive train including an engine, the transmission having an output shaft and a fluid coupling for transmitting the rotation of the engine to the transmission, the control system comprising:

a first clutch applied responsive to selection of a forward running range;

a second, one-way clutch applied when said clutch is applied, to establish a forward 1st speed;

a brake for locking said one-way clutch, when applied, to block reverse rotation of the output shaft of said transmission;

a first hydraulic servo for receiving a first oil pressure and for applying said clutch responsive to the first oil pressure;

a second hydraulic servo for receiving a second oil pressure to apply said brake; and a hydraulic control unit for feeding said first and second oil pressures, respectively, to said first and second hydraulic servos, said hydraulic control unit comprising:

pressure-reducing means for lowering said first oil pressure to said first hydraulic servo to lower than oil pressure at 1st speed in the forward running range, when the vehicle is stopped, the engine is idling and a foot brake is engaged; and oil pressure feeding means for feeding said second oil pressure to said second hydraulic servo at a level to generate, against the reverse force on the vehicle when facing up an incline, a resistance force corresponding to the forward driving force generated when the engine is idling in 1st speed.

8. A control system for an automatic transmission, according to claim 7, wherein said oil pressure feeding means is a modulator valve comprising a spool and a spring for urging said spool in a first direction, said spool having a first pressure receiving face which receives the second oil pressure for urging said spool in a second direction, against the urging of said spring, and a second pressure receiving face which receives the first oil pressure for urging said spool in said second direction against the urging force of said spring, and wherein:

said modulator valve feeds said second oil pressure to said second hydraulic servo responsive to a lowering of the first oil pressure to said first hydraulic servo, and blocks the feed of the second oil pressure to said second hydraulic servo at other times.

9. A control system for an automatic transmission, according to claim 8, wherein said brake is applied at a gear stage higher than that of the 1st speed to effect engine braking, wherein said pressure-reducing means includes: a regulator valve for regulating the first oil pressure fed to said first hydraulic servo to produce a forward range running pressure responsive to selection of a forward running range; and a change-over valve switchable between (1) a pressure-reducing position, in which the change-over valve feeds the oil pressure from said regulator valve to said first hydraulic servo responsive to selection of the forward running range with the vehicle stopped, the engine idling and the foot brake engaged, and (2) a forward running range pressure position, in which the change-over valve feeds the forward running range pressure to said first hydraulic servo, so that the first oil pressure is received at the second pressure receiving face of said modulator valve only when it is in said pressure-reducing position, and wherein said modulator valve feeds oil pressure for engine braking to said second hydraulic servo when the oil pressure of said first hydraulic servo is not applied to said second pressure receiving face.

10. A control system for an automatic transmission, according to claim 7, wherein said brake is applied at a gear stage higher than that of 1st speed to effect engine braking, wherein said oil pressure feeding means is a modulator valve having a spool and a spring for urging said spool in a first direction, said spool having a first pressure receiving face which receives the second oil pressure against the urging of said spring, and a second pressure receiving face which receives a signal pressure against the urging of said spring, wherein said pressure-reducing means includes: a regulator valve for regulating the first oil pressure fed to said first hydraulic servo and to produce a forward range running pressure responsive to selection of a forward running range; and a change-over valve switchable between (1) a pressure-reducing position, in which the change-over valve feeds the oil pressure from said regulator valve to said first hydraulic servo responsive to selection of the forward running range with the vehicle stopped, the engine idling and the foot brake engaged, and, (2) a forward running range pressure position, in which the change-over valve feeds the forward running range pressure to said first hydraulic servo, so that the forward running range pressure is fed as said signal pressure to the second pressure receiving face of said spool of said modulator valve only when said modulator valve is in said pressure-reducing position, and wherein said modulator valve feeds oil sufficient for engine braking to said second hydraulic servo when the forward running range pressure is not applied to said second pressure receiving face of said spool of said modulator valve.

* * * * *

UNITED STATES PATENT AND TRADEMARK OFFICE
CERTIFICATE OF CORRECTION

PATENT NO. : 5,630,772
DATED : May 20, 1997
INVENTOR(S) : TSUKAMOTO et al

It is certified that error appears in the above-indentified patent and that said Letters Patent is hereby corrected as shown below:

Col. 6, line 64, "A" should read --A--.

Col. 8, line 15, "after "switch" insert --45;--; and line 57, "permits" should read --per its--.

Col. 11, line 52, after "engine" delete the comma ",".

Col. 14, line 20, "after "was" delete the colon ":".

Col. 15, line 31, after "is" delete the period ".".

Col. 20, line 8, delete "let" and insert --1st--.

Col. 22, line 31, after "and" delete the comma ",".

Signed and Sealed this

Sixteenth Day of June, 1998

Attest:

BRUCE LEHMAN

Attesting Officer  Commissioner of Patents and Trademarks